United States Patent
Kim et al.

(10) Patent No.: US 9,952,376 B2
(45) Date of Patent: Apr. 24, 2018

(54) LIGHTING DEVICE USING LINE SHAPED BEAM

(71) Applicant: LG INNOTEK CO., LTD., Seoul (KR)

(72) Inventors: Jin Su Kim, Seoul (KR); Seung Jong Baek, Seoul (KR); Dong Hyun Lee, Seoul (KR); Jae Hyuk Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 546 days.

(21) Appl. No.: 14/582,569

(22) Filed: Dec. 24, 2014

(65) Prior Publication Data
US 2015/0185401 A1  Jul. 2, 2015

(30) Foreign Application Priority Data
Dec. 27, 2013 (KR) .......................... 10-2013-0164888

(51) Int. Cl.
*F21V 7/04* (2006.01)
*F21V 8/00* (2006.01)
(Continued)

(52) U.S. Cl.
CPC ............. *G02B 6/0038* (2013.01); *B60Q 3/64* (2017.02); *F21S 48/1233* (2013.01);
(Continued)

(58) Field of Classification Search
CPC .. G02B 6/0038; G02B 6/4212; G02B 6/0041; G02B 6/0035; G02B 6/0036;
(Continued)

(56) References Cited

U.S. PATENT DOCUMENTS 5,269,977 A * 12/1993 Nakahashi ............ B29C 39/006
264/1.1
5,584,556 A * 12/1996 Yokoyama ........... G02B 6/0036
349/62
(Continued)

FOREIGN PATENT DOCUMENTS

EP         2 330 341 A1    6/2011
KR   10-2013-0044136 A    5/2013

OTHER PUBLICATIONS

Extended European Search Report dated Jun. 22, 2015 issued in Application No. 14200279.9.

*Primary Examiner* — Bryon T Gyllstrom
*Assistant Examiner* — James Endo
(74) *Attorney, Agent, or Firm* — Ked & Associates, LLP

(57) ABSTRACT

Provided is a lighting device capable of implementing optical images having desired shapes through a pattern design, the lighting device including: a light source portion having at least one light source; a light guide portion having a larger thickness than a height of a light emitting surface of the light source and irradiated by an incident beam from a side; and a three-dimensional effect forming portion provided inside the light guide portion, on a first surface, or on a second surface opposite to the first surface, wherein the three-dimensional effect forming portion includes multiple patterns sequentially arranged and having respective inclined surfaces with inclined angles with respect to the first surface, wherein the multiple patterns guide light passing along the light guide portion into a first surface direction or a second surface direction by refraction and reflection from the inclined surfaces, thereby implementing line shaped beams of a first path.

19 Claims, 11 Drawing Sheets

(51) Int. Cl.
*B60Q 3/64* (2017.01)
*F21S 8/10* (2006.01)

(52) U.S. Cl.
CPC ......... *F21S 48/215* (2013.01); *F21S 48/2212* (2013.01); *F21S 48/2243* (2013.01); *F21S 48/2268* (2013.01); *F21S 48/2281* (2013.01); *G02B 6/0053* (2013.01); *F21S 48/1241* (2013.01); *F21S 48/2225* (2013.01); *G02B 6/0035* (2013.01); *G02B 6/0036* (2013.01); *G02B 6/0068* (2013.01)

(58) Field of Classification Search
CPC ............... G02B 6/0053; F21S 48/2268; F21S 48/2231; F21S 48/2243; F21S 48/225; F21S 48/1241; F21S 48/2237; F21S 48/2225; B60Q 3/62; B60Q 3/64; B60Q 3/66
See application file for complete search history.

(56) References Cited

U.S. PATENT DOCUMENTS

| | | | | |
|---|---|---|---|---|
| 5,786,665 A * | 7/1998 | Ohtsuki | ............... | G02B 6/0021 313/113 |
| 7,465,084 B2 * | 12/2008 | Kawashima | ......... | G02B 6/0038 362/620 |
| 2003/0146688 A1 | 8/2003 | Kitazawa et al. | | |
| 2004/0071436 A1 * | 4/2004 | Kwon | ................ | G02B 6/0038 385/146 |
| 2005/0072032 A1 * | 4/2005 | McCollum | ............... | F21V 5/00 40/546 |
| 2005/0117370 A1 | 6/2005 | Kawashima et al. | | |
| 2008/0002432 A1 * | 1/2008 | Ueno | ................... | G02B 6/0028 362/620 |
| 2008/0019150 A1 * | 1/2008 | Park | ..................... | G02B 6/006 362/621 |
| 2009/0073721 A1 * | 3/2009 | Kamikatano | ............ | F21V 7/05 362/616 |
| 2009/0091912 A1 * | 4/2009 | Lee | ..................... | G02B 6/0038 362/23.19 |
| 2009/0213618 A1 * | 8/2009 | Lai | ....................... | G02B 6/0038 362/606 |
| 2010/0073955 A1 * | 3/2010 | Cornelissen | ........ | G02B 6/0068 362/554 |
| 2010/0128490 A1 * | 5/2010 | Shiu | ................... | G02B 6/0038 362/341 |
| 2010/0302802 A1 * | 12/2010 | Bita | .................... | G02B 6/0036 362/606 |
| 2010/0309684 A1 * | 12/2010 | Huang | ................ | G02B 6/0021 362/612 |
| 2011/0090713 A1 * | 4/2011 | Chen | .................... | G02B 6/0036 362/612 |
| 2011/0299013 A1 * | 12/2011 | Ishida | ................. | G02B 6/0038 349/65 |
| 2012/0262940 A1 * | 10/2012 | Miyairi | ................ | G02B 6/0038 362/602 |
| 2012/0268687 A1 * | 10/2012 | Kaida | ............. | B29D 11/00663 349/61 |
| 2012/0306861 A1 * | 12/2012 | Minami | ................ | G02B 6/0041 345/419 |
| 2013/0121024 A1 * | 5/2013 | Barth | .................. | G02B 6/0038 362/607 |

* cited by examiner

——— BRIGHTNESS CURVE OF FIRST EMBODIMENT
——— BRIGHTNESS CURVE OF SECOND EMBODIMENT
— — BRIGHTNESS CURVE OF THIRD EMBODIMENT
——— BRIGHTNESS CURVE OF FOURTH
········ BRIGHTNESS CURVE OF FIFTH EMBODIMENT

LIGHTING DEVICE USING LINE SHAPED BEAM

CROSS-REFERENCE TO RELATED APPLICATION

This application claims priority under 35 U.S.C. § 119 to Korean Application No. 10-2013-0164888, filed on Dec. 27, 2013, in the Korean Intellectual Property Office, whose entire disclosure is hereby incorporated by reference.

BACKGROUND

1. Field

Embodiments of the present disclosure relate to a lighting device capable of implementing line shaped beam images having desired shapes through a pattern design.

2. Background

In general, a lighting device is a device used for lightening a dark place using various light sources. The lighting device is used to shine a beam to a specific object or space and to express an atmosphere of the specific object or space in a desired shape or color.

According to the technical development of an LED (Light Emitting Diode), lighting devices in various shapes using the LED have recently come into wide use. For example, one of the lighting devices according to a conventional art includes a diffusion plate for emitting light emitted from an LED light source to the outside.

Most of the LED lighting devices according to the conventional art are configured so that light is uniformly outputted on an entire light emitting surface. Also, in order to express the atmosphere of a specific object or space in a desired shape or color, a color filter or a filter having a light permeable hole in a desired shape has been used in some lighting devices according to the conventional art.

However, when the atmosphere of a specific object or space is expressed in a desired shape or color using the LED lighting devices according to the conventional art, the configuration of the devices becomes mechanically complicated, and as a result, it is problematic in that the degree of freedom in design is limited, and it is difficult to install or maintain and manage the devices. As such, in order to express the atmosphere in a desired shape or color or an optical image, a light device having a simple structure, which is easy to install or maintain and manage, has been required.

BRIEF DESCRIPTION OF THE DRAWINGS

The embodiments will be described in detail with reference to the following drawings in which like reference numerals refer to like elements wherein.

DETAILED DESCRIPTION DISCLOSURE

Figure 1:
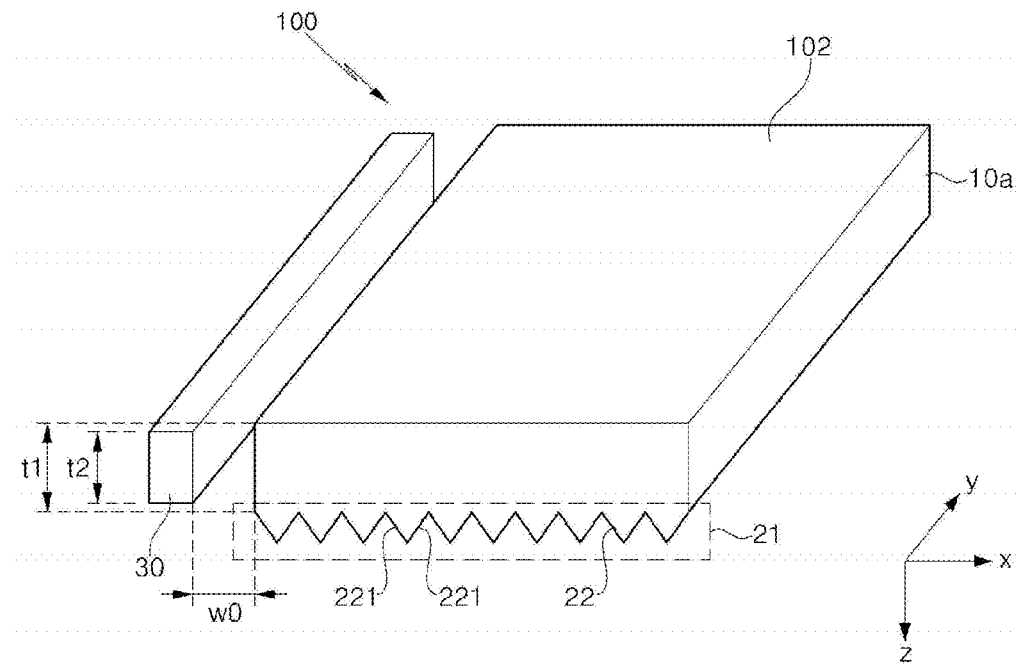
FIG. 1 is a perspective view of a lighting device according to an embodiment of the present disclosure.

Hereinafter, the embodiments of the present disclosure that an ordinary person skilled in the art can implement will be described with reference to the accompanying drawings. The embodiments in the specification and the constructions shown in the drawings are provided as a preferred embodiment of the present disclosure, and it should be understood that there may be various equivalents and modifications which could substitute at the time of filing. In addition, when it comes to the operation principle of the preferred embodiments of the present disclosure, when the known functions or functions are seemed to make unclear the subject matters of the present disclosure, they will be omitted from the descriptions of the disclosure. The terms below are defined in consideration of the functions of the present disclosure, and the meaning of each term should be interpreted by judging the whole parts of the present specification, and the elements having the similar functions and operations of the drawings are given the same reference numerals. As used herein, the singular forms "a," "an" and "the" may be intended to include the plural forms as well, unless the context clearly indicates otherwise.

Figure 2:
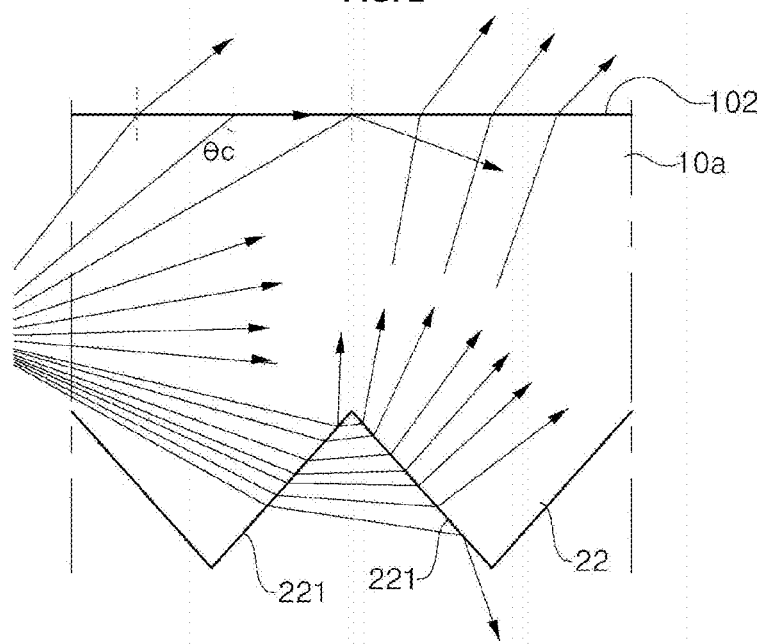
FIG. 2 is a partially enlarged cross-sectional view showing a part of the lighting device of FIG. 1.
Figure 3:
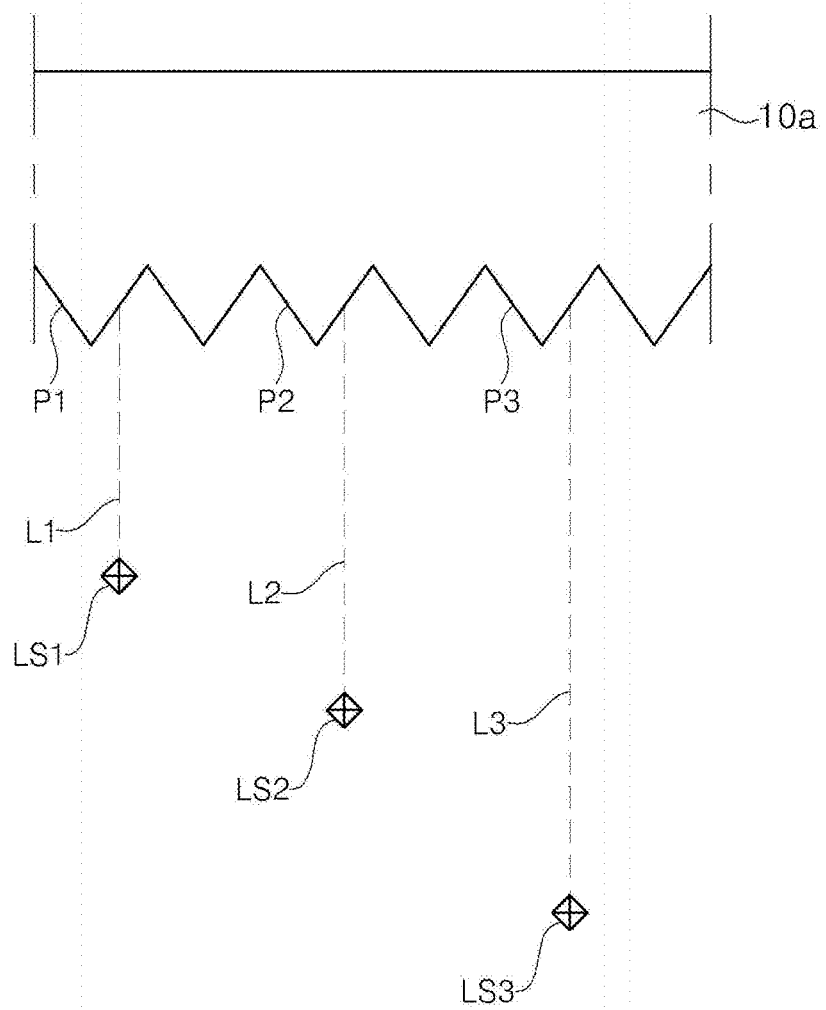
FIG. 3 is an enlarged cross-sectional view showing the other part of the lighting device shown in FIG. 1.

FIG. 1 is a perspective view of a lighting device according to an embodiment of the present disclosure. FIG. 2 is a partially enlarged cross-sectional view showing a part of the lighting device of FIG. 1. Furthermore, FIG. 3 is another partially enlarged view of the lighting device of FIG. 1.

Referring to FIG. 1, a lighting device 100 according to the present embodiment includes: a light guide portion 10a; a three-dimensional effect forming portion 21; and a light source portion 30.

The light guide portion 10a has a plate or film form and guides light of the inside from one side to the other side. The light guide portion 10a is provided as a transparent substrate. The light guide portion 10a may be provided as a transparent member in a plate or film form having a haze of 2% or less. In this case, the light guide portion 10a has transparency in which an object of the other surface can be observed from one surface by clairvoyance.

The light guide portion 10a may be made of glass, resin or the like. A thermoplastic polymer, a photocurable polymer or the like may be used as a material of the light guide portion 10a. More specifically, the material of the light guide portion 10a may be polycarbonate, polymethylmethacrylate, polystyrene, polyethylene terephthalate or the like.

The light guide portion 10a may have a thickness t1 of about 0.1 mm or more and about 10.0 mm or less. When the thickness t1 of the light guide portion 10a is smaller than 0.1 mm, it is difficult to produce a height of a light emitting surface of an LED element of the light source portion 30 to be smaller than 100 μm or heavy production costs are consumed. Also, when the thickness T1 of the light guide portion 10a is larger than 10.0 mm, a thickness and a weight of the device may be increased and material costs may be also increased.

Also, according to some embodiments, the light guide portion 10a may have a thickness t1 of about 100 μm or more and about 250 μm or less. In this case, the light guide portion 10a may have flexibility for enabling the light guide portion to be appropriately wound on a roll device. Also, according to some embodiments, the thickness t1 of the light guide portion 10a may be in the range of about 250 μm or more and about 10.0 mm or less. In this case, since it is difficult to wind the light guide portion 10a on a roll device, the light guide portion may have a plate form and may be applied to an application product in such a form.

The three-dimensional effect forming portion 21 is configured to include multiple patterns 22 provided by removing a part of one surface of the light guide portion 10a. The multiple patterns 22 have respective inclined surfaces 221 inclined with respect to a first surface of the light guide portion 10a or a second surface 102 opposite to the first surface and are configured to include respective concave portions or respective convex portions which are sequentially arranged in a predetermined direction (x-direction) of the first surface. When sequential arrangement directions of the multiple patterns 22 are designed in desired directions, the optical path of the incident beam passing along the three-dimensional effect forming portion 21 may be guided into a desired path (the first path), and the optical width and the luminous intensity may be limited to a desired form.

The light source portion 30 creates an incident beam that is reflected inside the light guide portion 10a and moves by irradiating light on a side of the light guide portion 10a. The light source portion 30 may include at least one LED (Light Emitting Diode) light source. The LED light source may be provided in an LED string form or an LED package form having a single LED element or multiple LED elements. In the case where the LED light source is used, the light source of the light source portion 30 may have a light emitting surface with a predetermined area according to each LED chip size. The light source may be intended to include the plural forms.

Also, the light source portion 30 may be arranged to be separated from one side of the light guide portion 10a by a predetermined distance w0. In this case, a separation space therebetween may be filled with a transparent material such as resin or the like. Of course, according to some embodiments, the light source portion 30 may be configured to be closely attached to one side of the light guide portion 10a without a separation space or may be configured to be buried in an inner side of the light guide portion 10a.

In the present embodiment, the light emitting surface of the light source may be arranged to face the side of the light source portion 10a and may have a circular shape, an elliptical shape, a triangular shape, a quadrangular shape, a pentagonal shape or a polygonal shape. In this case, regardless of the shape of a cross section, a height of the light emitting surface may be defined as a maximum length in a thickness direction of the light guide portion 10a, and a width of the light emitting surface may be defined as a maximum length in a direction that crosses at right angles to a thickness direction in the side of the light guide portion 10a and is parallel to the light emitting surface.

A height t2 of the light source portion 30 in the thickness direction of the light guide portion 10a is smaller than the thickness t1 of the light source portion 10a. This is intended for the light guide portion 10a so as to appropriately function as a member for receiving and guiding the incident beam when light emitted from the light emitting surface of the light source portion 30 is irradiated.

The light (the incident beam) traveling inside the light guide portion 10a is guided in a first surface direction toward which the first surface of the light guide portion 10a looks and a second surface direction toward which the second surface 102 looks by reflection and refraction generated from the inclined surfaces 221 of the multiple patterns 22 of the three-dimensional effect forming portion 21, and thanks to the guided light, the lighting device 100 implements a line shaped beam of a first path which crosses at right angles to respective pattern extension directions of the multiple patterns.

Referring to FIG. 2, light, which meets with the inclined surface 221 of each pattern 22 of the three-dimensional effect forming portion 21, is refracted or reflected according to each incidence angle. That is, when the incidence angle is smaller than a critical angle θc, the light passing along the light guide portion 10a penetrates the patterns 22 and is refracted according to a difference in a refractive index. Also, the light passing along the light guide portion 10a is reflected from the inclined surfaces 221 of the patterns 22 when the incidence angle is more than the critical angle θc.

A relation between the reflective index and the critical angle is represented by following Equations 1 and 2.

$$n = \frac{n1}{n2} = \frac{\sin\theta_c}{\sin 90°} \qquad \text{Equation 1}$$

$$\sin\theta_c = \frac{n1}{n2} \qquad \text{Equation 2}$$

Here, when n1 is a reflective index of air, and n2 is a reflective index of a medium (light guide portion), the critical angle may be represented by following Equation 3.

$$\sin\theta_c = \frac{1}{n2} \qquad \text{Equation 3}$$

When the principle of the reflection and refraction from the inclined surfaces 221 is used, the lighting device according to the present embodiment implements optical images having desired shapes and guided in a first surface direction toward which the first surface of the light guide portion 10a looks and in a second surface direction toward which the second surface 102 looks, by refraction and reflection of an incident beam from the multiple patterns 22 of the three-dimensional effect forming portion.

For appropriate refraction and reflection of the incident beam passing along the light guide portion 10a, the lighting device according to the present embodiment is designed so that the inclined surface of each of the patterns can have a predetermined surface roughness.

In the present embodiment, the inclined surface 221 may be a mirror-like finishing surface. Also, the inclined surface 221 may be a precision processing surface. As one example, with regard to the surface roughness of the inclined surface 221, even though there is a slight difference according to each processing method, a center line average roughness or an arithmetic mean roughness Ra may be about 0.02 or less, and a maximum height roughness Rmax may be about 0.3. According to some embodiments, the surface roughness of the inclined surface may be a ten point median height Rz of less than 0.8. Here, the unit of roughness may be μm and a standard length may be 0.25 mm The surface roughness of the inclined surface is intended to secure a reflectance of the inclined surface in a range beyond a predetermined value. When the surface roughness shows a larger surface roughness than the value described above, it is difficult to properly implement a line shaped beam due to the scattering of light or light beyond a fixed amount returning from the inclined surface to the light source.

According to the present embodiment, a line shaped beam or a three-dimensional effect beam of a specific optical path may be implemented by controlling a refraction and reflection ability of the inclined surfaces 221 of the multiple patterns 22 through a pattern design for the patterns 22 of the three-dimensional effect forming portion 21.

That is, the light passing along the multiple patterns 22 of the three-dimensional effect forming portion 21 may be guided to a specific optical path and may be limited to an optical width by refraction and reflection from the inclined surfaces of the patterns according to the pattern design. Here, the specific optical path refers to a movement path of light guided in the direction crossing each of the pattern extension directions of the multiple patterns 22. The specific optical path includes the first path of light traveling along the direction in which the multiple patterns are sequentially arranged. The principle of generation of the optical path is based on the Fermat's principle that 'a ray of light passing along the three-dimensional effect forming portion 21, namely, a ray of light passing along a medium travels along a movement path that can be traversed in the least time.'

Furthermore, the specific optical width may be limited in a desired shape through a pattern design for controlling pattern conditions, such as a between adjacent two main patterns and the like. For example, the specific optical path and the specific optical width may be implemented to extend to the extent of a first length while having a fixed width according to a pattern design, may be implemented to extend to the extent of a second length shorter than the first length while having an optical width which reduces gradually, or may be implemented to be similar to the first length or to be shorter or longer than the first length while having an optical width which increases gradually.

As such, according to the present embodiment, the optical path, the optical width and luminous intensity of the incident beam passing along the light guide portion 10a can be controlled through the pattern design, and accordingly, line shaped beams, three-dimensional effect beams or line shape beams with a three-dimensional effect can be implemented.

The line shaped beam, the three-dimensional effect beam or the line shaped beam with the three-dimensional effect will be described in greater detail with reference to FIG. 3 as follows.

A first pattern P1, a second pattern P2 and a third pattern P3 are selected from the multiple patterns of the three-dimensional effect forming portion. The first to third patterns P1, P2, P3 are sequentially arranged at a position which is gradually further away from the light source. The first to third patterns P1, P2, P3 may be sequentially arranged patterns or patterns in which another pattern is arranged between two adjacent patterns. A second optical path from the light source to the second pattern is longer than a first optical path with respect to the first pattern, and is smaller than a third optical path with respect to the third pattern.

That is, when the first to third patterns P1, P2 P3 of the three-dimensional effect forming portion are viewed from a predetermined standard point or an observing point in the first surface direction of the outside, a second distance L2 from a second dummy light source LS2 of the light source resulting from the inclined surface of the second pattern to the inclined surface of the second pattern is longer than a first distance L1 from a first dummy light source LS1 of the light source resulting from the inclined surface of the first pattern to the inclined surface of the first pattern, and is shorter than a third distance L3 from a third dummy light source LS3 of the light source resulting from the inclined surface of the third pattern to the inclined surface of the third pattern.

In other words, the multiple patterns of the three-dimensional effect forming portion serve as indirect light sources which are located far away from a predetermined standard point or an observing point as each distance (corresponding to L1, L2, L3) from the light source portion 30 as viewed from the outside of the light guide portion 10a is gradually increased by refraction and reflection of each of the inclined surfaces. Here, specific parts of the optical path of the multiple patterns serves as indirect light sources, and at this time, the indirect light sources are sequentially arranged along the optical path, and as each distance from the light sources is gradually increased, the indirect light sources are provided as dummy light sources LS1, LS2, LS3 in which the intensity of light is reduced by being located far away from the standard point.

The three-dimensional effect beam may refer to an optical image having a sense of distance or a perceptional depth, which is configured such that a kind of line-shape beam concentrated into a predetermined optical path (the first path) by a pattern design gradually enters the light guide portion 10a, namely, from the first surface of the light guide portion 10a toward the second surface of the light guide portion 10a, as viewed from the first surface direction or the second surface direction. The three-dimensional effect beam may be one example of a line shaped beam and may be another name for a specific optical image of the line shaped beam.

According to the present embodiment, the multiple patterns of the three-dimensional effect forming portion are operated as indirect light sources in which as a distance from the light source is gradually increased by the inclined surface of each of the multiple pattern, optical paths become longer in regular sequence and brightness becomes lower, so that the lighting device may create a three-dimensional effect beam having a sense of distance and a perceptional depth in the thickness direction of the light guide portion 10a.

Meanwhile, in the present embodiment, the multiple patterns 22 are provided by removing a part of the first surface of the light guide portion 10a, but the present disclosure is not limited thereto. That is, according to some embodiments, the multiple patterns 22 may be provided by a separate pattern layer bonded to the first surface or the second surface of the light guide portion 10a.

Figure 4:
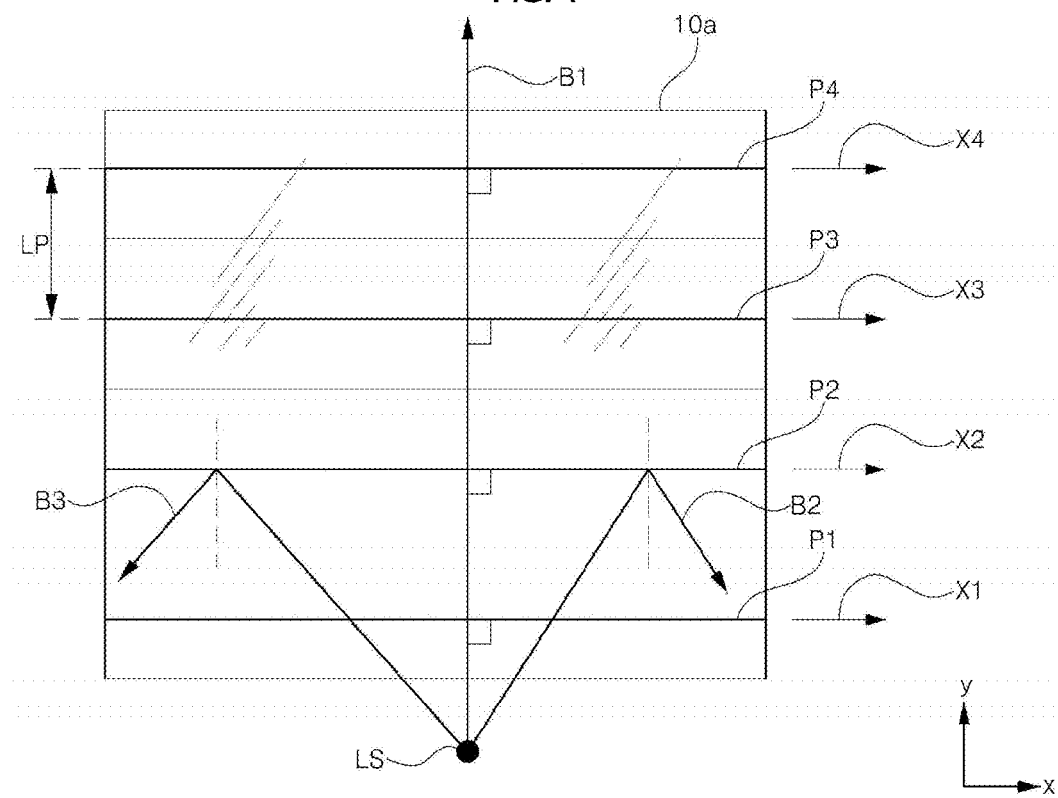
FIG. 4 is a partially enlarged plan view of the lighting device of FIG. 1.

FIG. 4 is a partially enlarged view of the lighting device of FIG. 1.

FIG. 4 may correspond to a partially enlarged view of the multiple patterns as viewed to face the three-dimensional effect forming portion 21 of the light guide portion 10a of FIG. 1 in a state of being placed on a plane.

Referring to FIG. 4, when the multiple patterns P1, P2, P3, P4 are sequentially arranged in the y-direction with respect to the light source LS, a part (a first incident beam) of beams emitted from the light source LS is implemented as a line shaped beam B1 traveling along the first path which crosses at right angles to respective pattern extension directions x1, x2, x3, x4 of the multiple patterns P1, P2, P3, P4. Here, the y-direction becomes a direction of the first path.

Also, with regard to the implementation of the line shaped beam B1 resulting from the pattern design, the multiple patterns P1, P2, P3, P4 guide a second incident beam in a direction other than the first path by refraction and reflection generated from the inclined surfaces.

Among the beams directed toward the inclined surfaces of the respective patterns, the second incident beam may be a beam (hereinafter referred to as 'an ambient beam') that meets with the inclined surfaces by roughly traveling in an inclination direction between a +y direction and a +x direction, and a +y direction and a −x direction on a plan defined by the pattern extension directions and the y-direction, and is refracted or is regularly reflected by the inclined surfaces.

Furthermore, the inclination direction may be defined as, for example, a direction toward a first quadrant and a fourth quadrant of both sides of the line-shape beam B1 in the first path that travels from the light source LS to a +y axis on an x-y plane. The x-y plane may correspond to the first surface or the second surface of the light guide portion 10.

Also, according to the present embodiment, each of the pattern extension directions x1, x2, x3, x4 of the multiple patterns may be a direction in which a specific straight line parallel to the first surface of the light guide portion 10a extends from each inclined surface of the multiple patterns or a direction in which a specific tangent line in contact with a curved line of each inclined surface extends. The respective pattern extension directions x1, x2, x3, x4 may be parallel to the first surface of the light guide portion 10a.

As one example, when the respective pattern extension directions x1, x2, x3, x4 of the multiple patterns P1, P2, P3, P4 are designed to be parallel to each other, the light passing along the multiple patterns is expressed as a line shaped beam in a straight line form that starts from the pattern P1 which first meets with the incident beam of the light source LS and travels to a specific optical path (the first path) which crosses at right angles to the pattern extension directions of the multiple patterns P2, P3, P4. It may be defined that a length of the line shaped beam is larger than a width of the line shaped beam and an optical width of the line shaped beam is less than a width of the light emitting surface of the light source of the light source portion.

Figure 6:
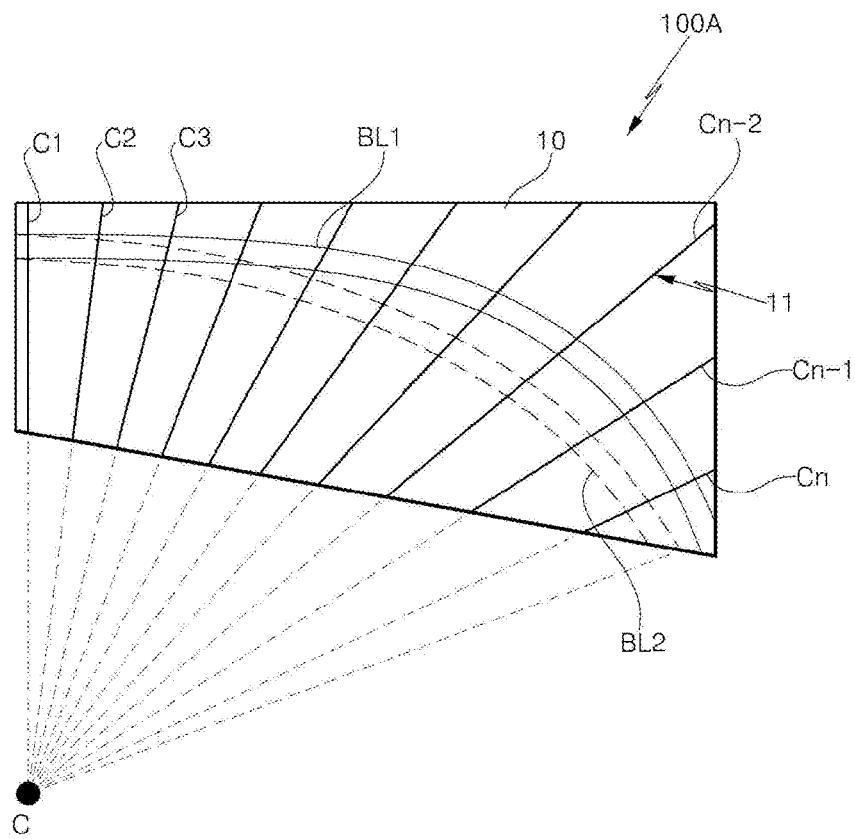
FIG. 6 is a partially enlarged plan view of a three-dimensional effect forming portion which can be applied to the lighting device of FIG. 1.

Also, according to some embodiments, when the respective pattern extension directions x1, x2, x3 x4 of the multiple patterns are designed to cross each other from at least one point without being not parallel to each other or to extend in a radial direction, unlike the first path to which the first line shaped beam B1 travels, the light passing along the multiple patterns may be expressed as a line shaped beam in a curved line form in which the beam is bent to a side in which a distance between the adjacent patterns reduces gradually (see FIG. 6).

In this case, a distance Lp (corresponding to a pitch or average distance) between two adjacent patterns may range from about 10 μm to about 500 μm This distance Lp is based on a minimum distance and a maximum distance for implementing a line shaped beam or a three-dimensional effect beam, and when the distance is beyond the range, it may be difficult to implement the line shaped beam or the three-dimensional effect beam.

According to the present embodiment, since the second incident beam is dispersed on the respective inclined surfaces of the patterns of the three-dimensional effect forming portion in a relatively wide range, as viewed from an arbitrary standard point on a straight line which crosses the x-y plane, or an observing point, the second incident beam becomes an ambient beam B2, B3 passing along a peripheral portion or a dark space of the periphery of the line shaped beam that is clearly distinguished due to relatively low brightness compared to a line shaped beam portion (hereinafter referred to as 'a bright portion') resulting from the first an incident beam. According to the present embodiment, the lighting device may implement a line shaped beam by limiting and guiding a part of the incident beam from the light source to the first path, and the lighting device may distribute the rest of the incident beam to the ambient beam passing along the dark space of the periphery of the line shaped beam.

Figure 5:
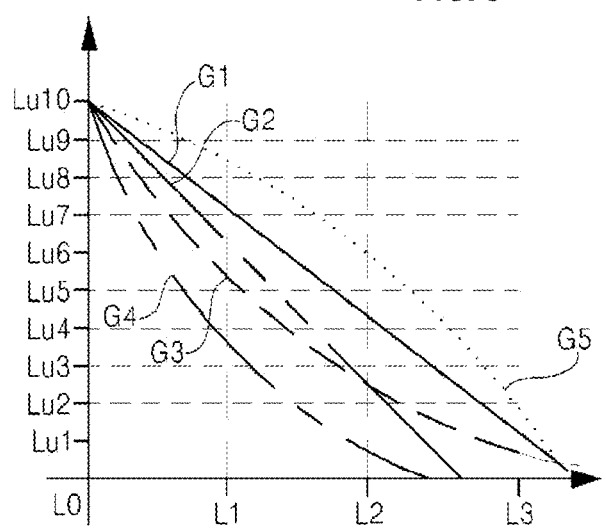
FIG. 5 is a graph showing a brightness change generated in a first path of the lighting device of FIG. 1.

FIG. 5 is a graph showing a brightness change generated in a first path of the lighting device of FIG. 1.

Referring to FIG. 5, with regard to the three-dimensional effect forming portion of the lighting device according to the present embodiment, the multiple patterns sequentially arranged from the light source are divided into the patterns of three sections, and reviewing brightness resulting from reflection and refraction of the patterns in the respective areas, each of the multiple patterns shows brightness in different ranges according to each distance L1, L2, L3 from the light source.

That is, when the multiple patterns of the three-dimensional effect forming portion are divided into first patterns of a first area L0-L1, second pattern of a second area L1-L2 and third patterns of a third area L2-L3 in terms of each distance from the light source, a second brightness of the second patterns is lower than a first brightness of the first patterns and is higher than a third brightness of the third patterns. Here, a second distance L2 between the light source and the specific second pattern farthest away from the light source among the second patterns is longer than a first distance L1 between the light source and the specific first pattern farthest away from the light source among the first patterns and is shorter than a third distance L3 between the light source and the specific third pattern farthest away from the light source among the third patterns.

More specifically, when a maximum brightness of the closest main pattern to the light source is level 10 Lu10, the specific first main pattern positioned at the first distance L1 from the light source may have a brightness of about level 8 Lu8, level 7 Lu7, level 6 Lu6, level 5 Lu5 or level 4 Lu4 according to different pattern designs of the first to fifth embodiment. The specific second main pattern positioned at the second distance L2 from the light source may have a brightness of about level 6 Lu6, level 4 Lu4, level 2 Lu2, or level 1 Lu1 according to pattern designs. Furthermore, the specific third main pattern positioned at the third distance L3 from the light source may have a brightness of about level 2 Lu2, level 1 Lu1, or level 0 (no brightness).

In consideration of the multiple patterns of the three-dimensional effect forming portion of the lighting device 100 of FIGS. 1 to 4, the multiple patterns may implement line shaped beams in which an incident beam is refracted and reflected from each inclined surface, and thus luminous intensity reduces as an optical path increases gradually in the first path. This is because specific parts of the multiple patterns of the first path function as sequentially arranged indirect light sources in which a sense of distance or a perceptional depth increases and luminous intensity reduces as a distance from the light source increases gradually.

Referring to FIG. 5 again, as shown in a brightness curve G1 of a first embodiment, according to a predetermined pattern design of the first embodiment, the first pattern, the second pattern and the third pattern serve as indirect light sources having brightness values of about level 7, level 4 and level 1, respectively. According to this configuration, as a distance from the light sources increases gradually, the multiple patterns may implement line shaped three-dimensional effect beams having a sense of increased distance from the multiple patterns, and luminous intensity which is substantially regularly reduced. In order to implement the three-dimensional effect beams, the multiple patterns may be designed in a fixed pitch.

Also, according to a pattern design of a second embodiment, as shown in a brightness curve G2 of the second embodiment, the first pattern, the second pattern and the third pattern serve as indirect light sources having respective brightness values of about level 6, level 3, and level 0. According to such a configuration, the multiple patterns may implement three-dimensional effect beams having an increased perceptional depth in the thickness direction of the light guide portion from the multiple patterns and the intensity of light which is regularly rapidly reduced as a distance from the light sources increases gradually. In order to implement the three-dimensional effect beams, the multiple patterns may be designed such that as a distance from the light sources increases gradually, a pitch reduces or a pattern density per a unit length increases at a fixed rate.

Also, according to a pattern design of a third embodiment, as shown in a brightness curve G3 of the third embodiment, the first pattern, the second pattern and the third pattern serve as indirect light sources having respective brightness values of about level 5, level 2, and level 1. According to such a configuration, the multiple patterns may implement three-dimensional effect beams in which a brightness reduction rate between the first area L0-L1 and the second area L1-I2 is larger than a brightness reduction rate between the second area L1-L2 and the third area L2-L3 as a distance from the light source increases gradually. In order to implement the three-dimensional effect beams, the multiple patterns may be designed in a fixed pitch which is narrower than the pitch of the first embodiment, or may be provided such that a pitch is gradually increased according to an increase in a distance from the light source while being designed in a fixed pitch which is narrower than the pitch of the first embodiment.

Also, according to a pattern design of a fourth embodiment, as shown in a brightness curve G4 of the fourth embodiment, the first pattern, the second pattern and the third pattern serve as indirect light sources having respective brightness values of about level 4, level 1, and level 0. According to such a configuration, the multiple patterns may implement three-dimensional effect beams in which brightness is further rapidly reduced relatively compared to the case of the third embodiment. In order to implement the three-dimensional effect beams, the multiple patterns may be designed in a fixed pitch narrower than the pitch of the third embodiment, or may be provided such that a pitch is gradually reduced according to an increase in a distance from the light source while being designed in a fixed pitch narrower than the pitch of the third embodiment.

Also, according to a pattern design of a fifth embodiment, as shown in a brightness curve G5 of the fifth embodiment, the first pattern, the second pattern and the third pattern serve as indirect light sources having respective brightness values of about level 8, level 6, and level 2. According to such a configuration, the multiple patterns may implement three-dimensional effect beams in which a brightness reduction rate between the first area L0-L1 and the second area L1-I2 is smaller than a brightness reduction rate between the second area L1-L2 and the third area L2-L3 as a distance from the light source increases gradually. In order to implement the three-dimensional effect beams, the multiple patterns may be designed in a fixed pitch which is wider than the pitch of the first embodiment, or may be provided such that a pitch is gradually reduced according to an increase in the distance from the light source while being designed in a fixed pitch which is wider than the pitch of the first embodiment.

In the aforesaid first to five embodiments, it is assumed that the respective embodiments are identical to each other with respect to the pattern structures and reflection abilities of the inclined surfaces of the respective patterns for the respective embodiments. When there is a difference in the pattern structures and the reflection abilities among the patterns, by adjusting a pattern design in consideration of this fact, three-dimensional effect beams having brightness which is naturally reduced may be obtained by the indirect light source effects of the multiple patterns sequentially arranged.

According to the present embodiment, thanks to the effect of the reduction in brightness and the effect of the indirect light sources of the multiple patterns resulting from a difference in the distance from the light sources, namely, a difference in optical paths, a line shaped beam, a three-dimensional effect beam or a line shaped beam with a three-dimensional effect can be implemented.

FIG. 6 is a partially enlarged plan view of a three-dimensional effect forming portion which can be applied to the lighting device of FIG. 1.

Referring to FIG. 6, a lighting device 100A according to the present embodiment is configured to include the light guide portion 10, the three-dimensional effect forming portion provided on one surface of the light guide portion 10 and the light source portion (see reference numeral 30 of FIG. 1).

The three-dimensional effect forming portion is configured to include the multiple patterns provided in a structure in which pattern arrangement directions cross each other from the first surface of the light guide portion 10. The multiple patterns include a first pattern C1, a second pattern C2, a third main C3, an n-second pattern Cn-2, an n-first pattern, and an nth pattern Cn in order of the location nearest to the light source. Here, n is a natural number of 6 or more.

In the present embodiment, the multiple patterns are arranged to extend in directions which are not parallel to each other. That is, with regard to the respective pattern extension directions of the multiple patterns, virtual extension lines thereof may meet at one point of intersection C.

According to the present embodiment, when the light of the light source passes along the three-dimensional effect forming portion, the multiple patterns may implement a line shaped beam BL1 of the first path (optical path) which is bent with a curvature to a side in which the pattern extension directions cross each other, namely, a side in the which an intersecting point C is present. This is because the light travels along a direction meeting at right angles to each of the pattern extension direction of the multiple main patterns according to the Fermat's principle that 'a ray of light traveling in a medium travels along a movement path that can be traversed in the least time.'

Also, when an observing point or a fixed standard point of an observer (a person, a camera or the like) who observes the line shaped beam BL1 of the first path is moved from a first point Pa to a second point Pb, the lighting device of the present embodiment expresses a line shaped beam BL2 traveling along another optical path instead of the line shaped beam BL1 traveling along the first path. This is because the position of the first path meeting at right angles to the pattern extension directions of the multiple patterns is moved to a direction opposite to the movement direction of the standard point according to a change of the standard point.

As described above, the lighting device of the present embodiment may implement the line shape beams having various optical images (a straight line form, a curved line form or a combination form thereof) expressed by traveling along the pattern extension directions of the multiple patterns according to the position of the standard point or the observing point through a pattern design of the three-dimensional effect forming portion.

Figure 7:
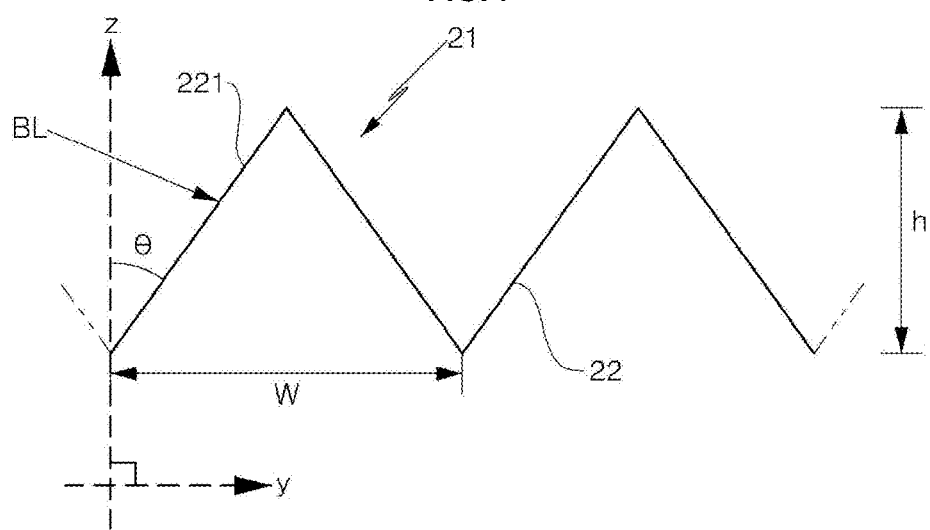
FIG. 7 is a view showing patterns of the three-dimensional effect forming portion of the lighting device of FIG. 1.

FIG. 7 is a view showing patterns of the three-dimensional effect forming portion of the lighting device of FIG. 1.

Referring to FIG. 7, the respective patterns 22 of the three-dimensional effect forming portion 21 according to the present embodiment may be provided so as to have a pattern structure in a triangular cross section form. When each of the patterns 22 has the triangular cross section structure, each of the inclined surfaces 221 has a fixed inclination angle in the extension direction (y-direction) of the first surface or the pattern arrangement surface (see reference numeral 101 of FIG. 8). In other words, each of the inclined surfaces 221 is provided to be bent to the extent of a fixed inclination angle θ with respect to the direction (z-direction) meeting at right angles to the pattern arrangement surface.

The inclination angle θ is larger than about 5° and smaller than about 85°. The inclination angle θ may be further limited in consideration of a refractive index of the light guide portion, but the inclination angle may be basically designed in the range of about 5° to 85° in consideration of reflection and refraction beyond a fixed level from the inclined surfaces 221.

In one embodiment, when the refractive index of the light guide portion is about 1.30 to 1.80, an inclination angle of the inclined surface 221 on one side of the respective patterns 22 may be larger than 33.7° and smaller than 50.3°, or may be larger than 49.7° and smaller than 56.3° according to a standard direction (z-direction or y-direction).

Also, in another embodiment, the light guide portion or the multiple patterns may be made of a material having a high refractive index. For example, in the case of manufacturing high intensity LEDs, when a ray of light having a specific incidence angle penetrates a capsule material by passing along a semiconductor die, total internal reflection is performed due to a difference in an n value (a refractive index) between the semiconductor die (n=2.50~3.50) and a general polymeric capsule element (n=1.40~1.60), and accordingly, light extraction efficiency of the device is reduced. Thus, in order to properly solve this problem, a high refractive index polymer (n=1.80~2.50) is used. In the present embodiment, the light guide portion or the multiple patterns may be provided by utilizing the high refractive index polymer (n=1.80~2.50) used in manufacturing high intensity LEDs. In this case, the inclination angle of the inclined surface 221 of each pattern 22 may be larger than 23.6° and smaller than about 56.3°, or may be larger than 33.7° and smaller than 66.4° according to each refractive index of the multiple patterns.

Also, according to some embodiment, the multiple patterns may be coated with at least one functional layer having a high refractive index for refractive index adjustment.

An inclination angle according to the refractive index may be represented by following Equation 4 according to the Snell's law.

$$\frac{\sin\theta_1}{\sin\theta_2} = \frac{n2}{n1} \qquad \text{Equation 4}$$

In Equation 4, $\sin\theta1$ is a traveling angle or an incidence angle of light shown in a first medium of a first refractive index n1, and $\sin\theta2$ is an incidence angle or a traveling angle of light shown in a second medium of a second refractive index n2.

As previously described, the inclined surface of each of the multiple main patterns in the present embodiment may be provided to have an inclination angle θ ranging from about 5° to about 85° as an inclination angle which enables an incident beam to be reflected or refracted appropriately.

Also, according to the patterns 22 of the present embodiment, in addition to the inclination angle of the inclined surface, a rate of a width w to a height h may be limited to a fixed rate for convenience of a production process. A width of a bottom surface may correspond to a pitch.

For example, when the patterns of the three-dimensional effect forming portion are designed so as to emphasize a cubic effect of the line shaped beam, the width w of each of the patterns 22 may be provided to be equal to or smaller than the height h. Also, when the patterns are designed so that the line shaped beam with the three-dimensional effect can express a relatively long image, the width w of each of the patterns 22 may be provided to be larger than the height h.

As another example, when each of the multiple pattern 22 has a lenticular form, a rate (h/w) of a width (or a diameter) to a height of each of the multiple patterns 22 may be about ½ or less. At this time, an inclination angle θ of the inclined surface of each of the patterns 22 may be about 60° or less.

As such, in the present embodiment, by using the width w and the height h of each pattern 22 as factors for property adjustment, optical images of the line shaped beam, the three-dimensional effect beam or the like intended to be expressed by the lighting device may be efficiently controlled.

In the present embodiment, the width w between two adjacent patterns in the three-dimensional effect forming portion 21 may be 10 to 500 μm This width w may refer to an average distance among the multiple main patterns of the first path, and may be regularly or variously selected according to each pattern design or each desired shape of optical images.

Also, according to some embodiments, the multiple patterns may be configured to be concavely inserted into an inner side of the light guide portion in the pattern arrangement surface or the first surface of the light guide portion. In this case, each inclined surface of the patterns as the case described above has an inclination angle with respect to the pattern arrangement surface or the z-direction, and when a rate (h/w) of a width to a height of each of the patterns is designed to be about 1 or less, it may be easy to produce the patterns compared to the case in which a rate (h/w) of the width to the height of each of the patterns is 1 or more.

Figure 8:
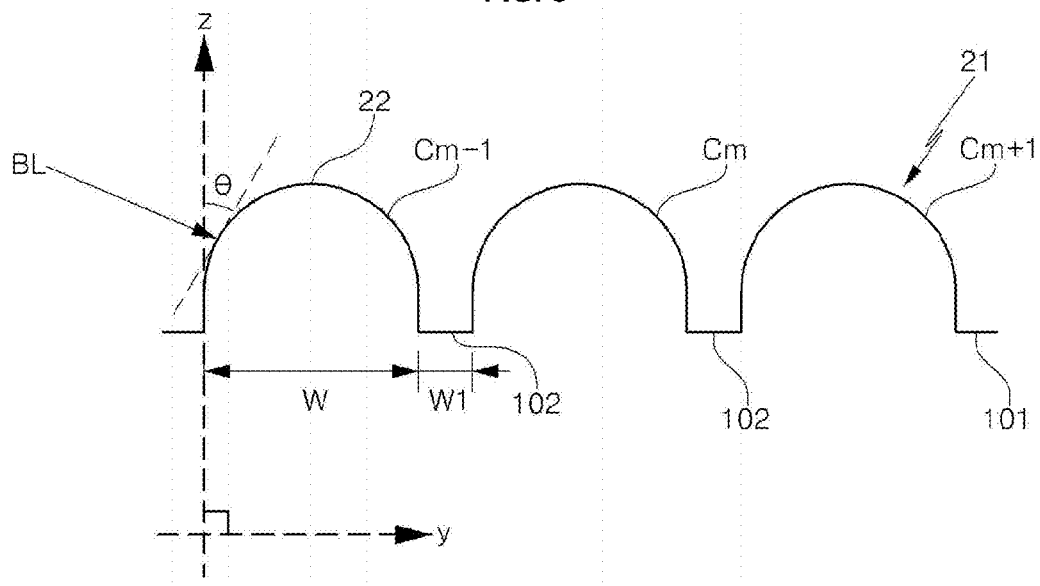
FIG. 8 is a view showing another embodiment for the patterns of the three-dimensional effect forming portion shown in FIG. 7.

FIG. 8 is a view showing another embodiment for the patterns of the three-dimensional effect forming portion shown in FIG. 7;

Referring to FIG. 8, when designing the three-dimensional effect forming portion 21 of the lighting device according to the present embodiment, the multiple patterns 22 may be provided so as to have a pattern structure having a semi-circular cross section or a semielliptical cross section. Each of the patterns 22 has an inclined surface inclined at a predetermined angle in a thickness direction (z-direction) of the light guide portion or a direction (y-direction) to which the first surface or a pattern arrangement surface 101 extends. Each of the patterns 22 may have a symmetrical form based on a center line (not drawn) in the z-direction, but is not limited thereto.

In the present embodiment, the inclined surface of each of the patterns 22 may have a structure in which an inclination angle is changed according to each position of the inclined surface due to the semicircular structure of the patterns. That is, since the inclined surface of each of the patterns 22 is a surface in contact with an arbitrary point on a circular arc, a tangent line in contact with an arbitrary point on each of the patterns 22 or a surface in contact with the arbitrary point may be placed at a fixed inclination angle θ in the direction (the z-direction) meeting at right angles to the pattern arrangement surface 101. The inclination angle θ may be larger than 0° and smaller than 90° according to each position of a circular cross section which the beam BL hits.

Also, the three-dimensional effect forming portion 21 of the present embodiment may include a spaced portion 102 provided between two adjacent patterns. That is, when the multiple patterns include a first pattern Cm−1, a second pattern Cm and a third pattern Cm+1 (wherein, m is a natural number of 2 or more), the three-dimensional effect forming portion 21 may include pattern separation portions 12 provided between the first pattern Cm−1 and the second pattern Cm, and between the second pattern Cm and the third pattern Cm+1.

Each of the pattern separation portions 102 may be a part of the first surface 101 positioned between two adjacent patterns as a part of the first surface 101 of the light guide portion in which concave patterns are not formed. Also, the pattern separation portion 102 may be provided for convenience of the manufacturing process as a gap between two adjacent patterns. The pattern separation portion 102 may be omitted according to a manufacturing process or a pattern design of specific implementation.

A width w1 of the pattern separation portion 102 is smaller than a width w of the pattern 22. The width w1 of the pattern separation portion 102 is may be about ⅕ or less or several μm or less of the width w of the pattern 22.

Figure 9:
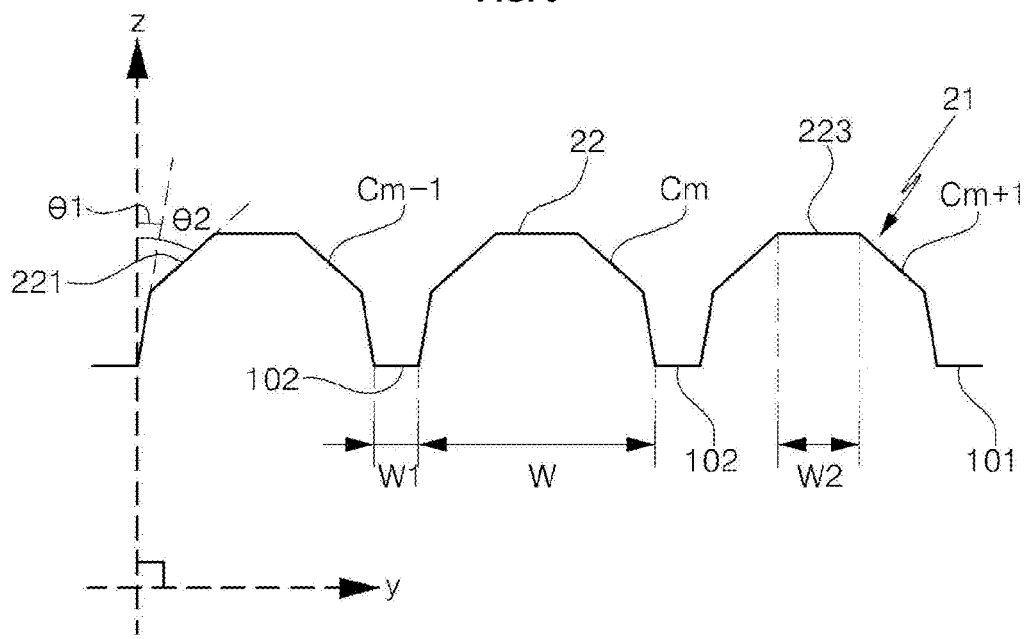
FIG. 9 is a view showing still another embodiment for the patterns of the three-dimensional effect forming portion shown in FIG. 7.

FIG. 9 is a view showing still another embodiment for the patterns of the three-dimensional effect forming portion shown in FIG. 7.

Referring to FIG. 9, when designing the three-dimensional effect forming portion 21 of the lighting device according to the present embodiment, the multiple patterns 22 may be provided to have a pattern structure having a polygonal section form. Each of the inclined surfaces 221 of the patterns 22 may have a broken-line graph form.

In the present embodiment, each of the inclined surfaces 221 of the patterns 22 is provided so as to have multiple inclination angles θ1, θ2 according to the number of segments of the broken-line graph in the direction (z-direction) crossing at right angles to the first surface or the pattern arrangement surface 101. The second inclination angle θ2 may be larger than the first inclination angle θ1. The first and second inclination angles θ1, θ2 may be designed within the range which is larger than about 5° and smaller than about 85° according to a position where the beam BL hits.

Also, the three-dimensional effect forming portion 21 may be configured to further include the pattern separation portion 102 provided between two adjacent patterns. A width w1 of the pattern separation portion 102 is smaller than the width w of each of patterns in order to naturally implement a line shaped beam or a three-dimensional effect beam via the three-dimensional effect forming portion 21. When a line shaped beam or a three-dimensional effect beam having a desired shape (a shape without an interruption or the like) is implemented through a design of the multiple patterns, the width w1 of the pattern separation portion 102 may be designed to be narrow maximally or may be designed so that the pattern separation portion 102 can be omitted. When the pattern separation portion 102 is provided, the pattern separation portion 102 is designed to have the width w1 of several μm or less.

Also, the three-dimensional effect forming portion 21 may have an interrupted surface 223 parallel to the pattern arrangement surface 113 of the respective patterns. The interrupted surface 223 is a part which does not function to enable light to be substantially emitted to the outside through the reflection or refraction of incident beam. Thus, since a line shaped beam implemented by the multiple patterns may have an interrupted part corresponding to the interrupted surface 223, a width w2 of the interrupted surface 223 may be appropriately designed in a range of several μm or less in order to implement a line shaped beam having a desired shape.

Figure 10:
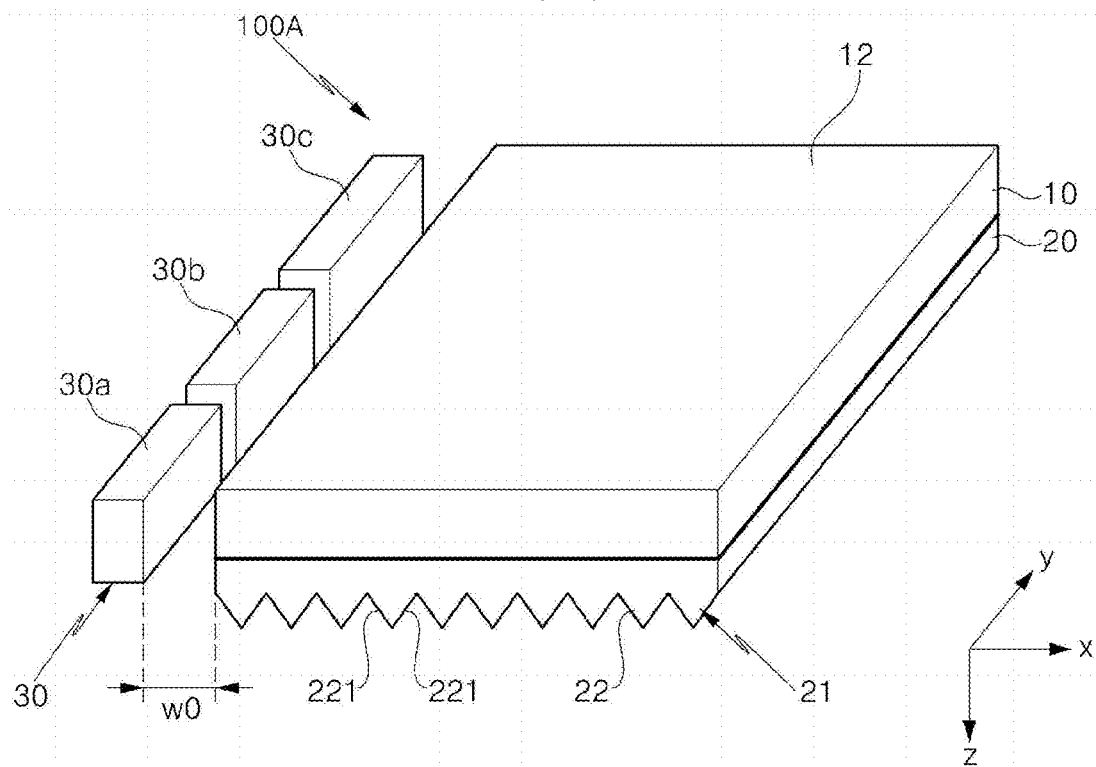
FIG. 10 is a perspective view of a lighting device according to another embodiment of the present disclosure.
Figure 11:
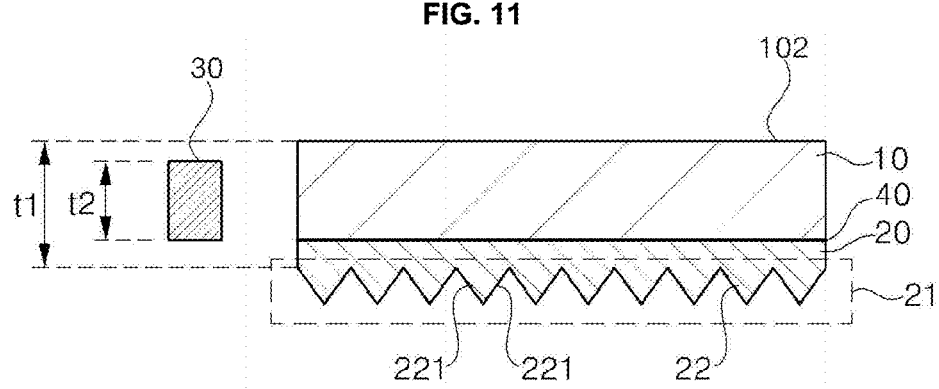
FIG. 11 is a cross-sectional view of the lighting device of FIG. 10.

FIG. 10 is a perspective view of a lighting device according to another embodiment of the present disclosure. FIG. 11 is a cross-sectional view of the lighting device of FIG. 10.

Referring to FIGS. 10 and 11, a lighting device 100A according to the present embodiment is configured to include: the light guide portion 10; the three-dimensional effect forming portion 21 provided on the first surface of the light guide portion 10; and the light source portion 30.

Referring to FIGS. 10 and 11, a lighting device 100A according to the present embodiment includes: the light guide portion 10; the three-dimensional effect forming portion 21 provided on the first surface of the light guide portion 10; and the light source portion 30.

The lighting device 100A of the present embodiment may be substantially identical to the lighting device 100 explained with reference to FIGS. 1 to 3 except for the fact that the three-dimensional effect forming portion 21 is provided by bonding a separate pattern layer 20 rather than being provided in a form in which a part of one surface of the light guide portion is removed.

The pattern layer 20 is made of a material identical or similar to that of the light guide portion 10. The pattern layer 20 may be provided with a transparent member having the multiple patterns. A resin material such as a thermosetting polymer, a photocurable polymer and the like may be used as the material of the pattern layer 20. The material of the pattern layer 20 may be polycarbonate, polymethylmethacrylate, polystyrene, polyethylene terephthalate, and the like.

The pattern layer 20 may be bonded to the first surface of the light guide portion 10 using a separate adhesive material. In this case, as illustrated in FIG. 11, an adhesive layer 40 is disposed between the light guide portion 10 and the pattern layer.

An optical transparent adhesive, an adhesive and the like may be used as the adhesive material of the adhesive layer 40. The adhesive material such as epoxy resin and the like may be used. The adhesive layer 40 may be implemented using PEA (Phenoxyethyl Acrylate) which is a high refractive material for adjustment of a refractive index. Also, the adhesive layer 40 may be made of a fluorinate polymer, a fluorinate monomer and the like.

Meanwhile, according to a manufacturing process, the pattern layer 20 may be directly bonded to the first surface of the light guide portion 10 without using a separate adhesive material. In this case, the pattern layer 20 has a heat reaction type adhesive property such as heat sealable property and heat welding and the like.

Referring to FIG. 10 again, the light source portion 30 may be identical to the light source portion of the lighting device of FIG. 1. However, the light source portion 30 of the present embodiment is configured to include multiple light sources 30a, 30b, 30c which are separated from each other by a predetermined distance. In this case, the light source portion 30 may irradiate light in directions parallel to each other or different directions in different areas of the light guide portion 10 or may irradiate light in opposite directions facing each other. That is, when multiple line shaped beams may be implemented using the patterns of multiple groups arranged in different arrangement directions in different areas of the light guide portion 10, and the multiple light sources, the lighting device 100A of the present embodiment may implement multiple line shaped beams of different optical paths.

Figure 12:
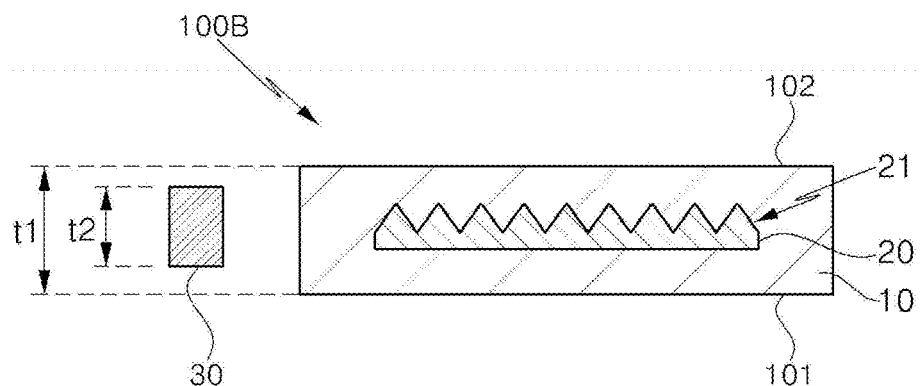
FIG. 12 is a cross-sectional view of a lighting device according to still another embodiment of the present disclosure.

FIG. 12 is a cross-sectional view of a lighting device according to still another embodiment of the present disclosure.

Referring to FIG. 12, a lighting device 100B according to the present embodiment is configured to include: the light source portion 30; the light guide portion 10; and the three-dimensional effect forming portion 21 buried in the light guide portion. The three-dimensional effect forming portion 21 may be implemented by arranging the pattern layer 20 having the multiple patterns on one surface thereof inside the light guide portion 20.

The light source portion 30 may be substantially identical to any one of the light source portions of the lighting devices previously described with reference to FIGS. 1 to 11.

In order for the light guide portion 10 to appropriately function as a light guide member, a thickness t1 of the light guide portion 10 is longer than a height of the light source portion 30. More specifically, the thickness t1 of the light guide portion 10 is larger than a height of the light emitting surface of the light source.

The pattern layer 20 may be the pattern layer previously described with reference to FIGS. 10 and 11. With regard to one of manufacturing methods applicable for forming the pattern layer 20, the pattern layer 20 is formed by disposing the pattern layer 20 on a first resin layer provided in a predetermined height for forming the light guide portion 10 and covering an upper part of the first resin layer, on which the pattern layer 20 is disposed, with a second resin layer.

When the multiple patterns of the three-dimensional effect forming portion 21 are disposed closer to the first surface 101 than the second surface 102 of the light guide portion 10, the multiple patterns may express line shape beams or three-dimensional effect beams by reflection and refraction the most of light traveling inside the light guide portion 10.

Figure 13:
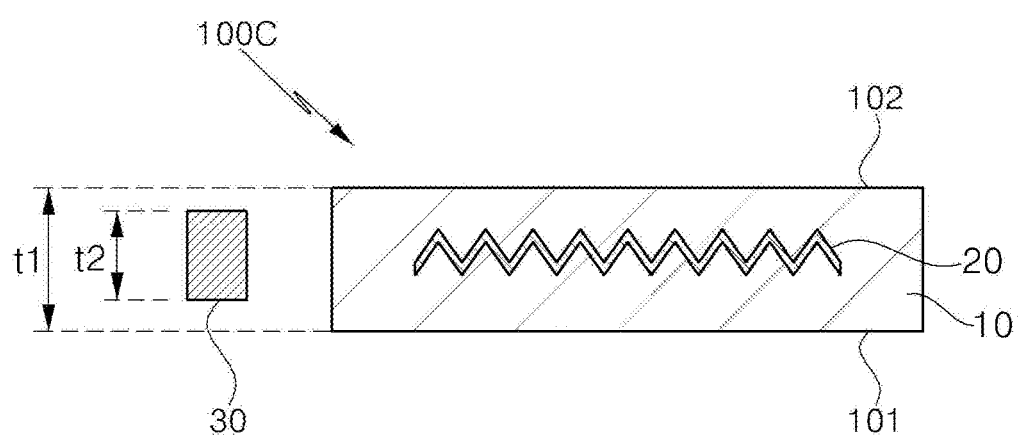
FIG. 13 is a cross-sectional view of a lighting device according to still another embodiment of the present disclosure.

FIG. 13 is a cross-sectional view of a lighting device according to still another embodiment of the present disclosure.

FIG. 13 is a plan view of a lighting device according to still another embodiment of the present disclosure;

Referring to FIG. 13, a lighting device 100C according to the present embodiment is configured to include: the light source portion 30; the light guide portion 10; and the three-dimensional effect forming portion 21 buried in the light guide portion. The three-dimensional effect forming portion 21 may be implemented by arranging the pattern layer, which is bent several times in a zigzag form for forming the multiple patterns, inside the light guide portion 10.

The lighting device 100C of the present embodiment is substantially identical to the lighting device 100B previously described with reference to FIG. 12 except for the fact that the pattern layer 20 is formed in the zigzag form, and accordingly, the detailed description thereof is omitted in order to avoid overlapping.

Figure 14:
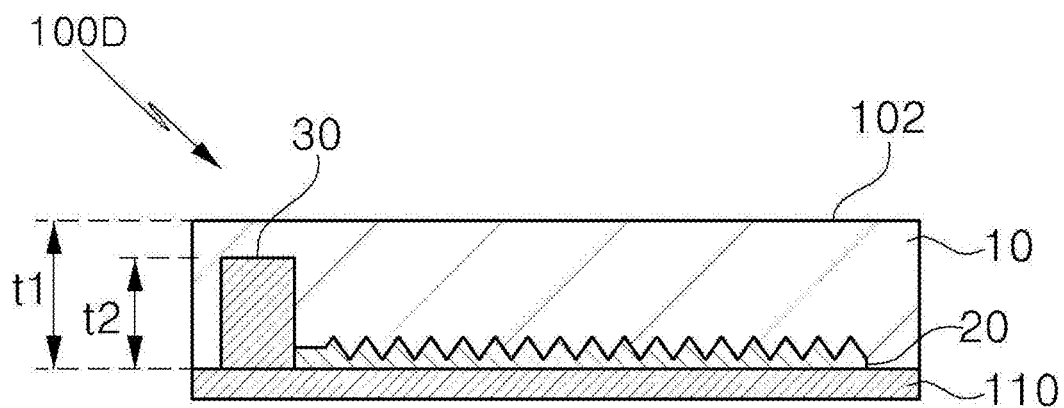
FIG. 14 is a cross-sectional view a lighting device according to still another embodiment of the present disclosure.

FIG. 14 is a cross-sectional view of a lighting device according to still another embodiment of the present disclosure.

Referring to FIG. 14, a lighting device 100D according to the present embodiment is configured to include: the light guide portion 10; the three-dimensional effect forming portion 21 disposed on one surface of the light guide portion 10; the light source portion 30; and a support member 110. The three-dimensional effect forming portion 21 may be disposed between the light guide portion 10 and the support member 110 and may be implemented by the pattern layer 20 having the multiple patterns on one surface thereof.

According to the lighting device 100D of the present embodiment, the light source portion 30 and the three-dimensional effect forming portion 21 are disposed on one surface of the support member 110, and on the one surface of the support member 110, the light source portion and the three-dimensional effect forming portion are buried by the light guide portion 10. In the light source portion 30, a part buried by the light guide portion 10 may be a light source.

The lighting device 100D of the present embodiment is substantially identical to the lighting device 100B or 100C previously described with reference to FIG. 11 or 12, except for the fact that the support member 110 is laminated on one surface of the light guide portion 10, and at least one part of the light source portion 30 is buried by the light guide portion 10, and accordingly, the detailed description thereof is omitted for avoiding overlapping.

The support member 110 may be provided using a transparent substrate. The transparent substrate may be made of the same material as that of the light guide portion 10. In the present embodiment, it is illustrated that the support member 110 has a thinner thickness than the thickness t1 of the light guide portion 10, but is not limited thereto. For example, the support member 110 may have a thicker thickness than the thickness of the light guide portion 10 according to some embodiments.

Also, the support member 110 may be made of an opaque material according to some embodiments. If any device, product or place enables the pattern layer 20 and the light source portion 30 to be disposed on one surface, and an upper part of a structure, in which the pattern layer 20 and the light source portion 30 are disposed, to be covered by the light guide portion 10, the device, product or place may be used as the opaque material.

For example, the support member 110 may be at least one part of a housing, a wall inside or outside a building, or one surface of a specific product or an instrument. Also, the support member 110 may be implemented by using at least one part of a desktop computer, a monitor frame, a desk, a chair, a portable terminal (smart phone, smart pad or the like), a cap, clothes, shoes, a bag, an accessory, indoor or outdoor interior components and the like.

Figure 15:
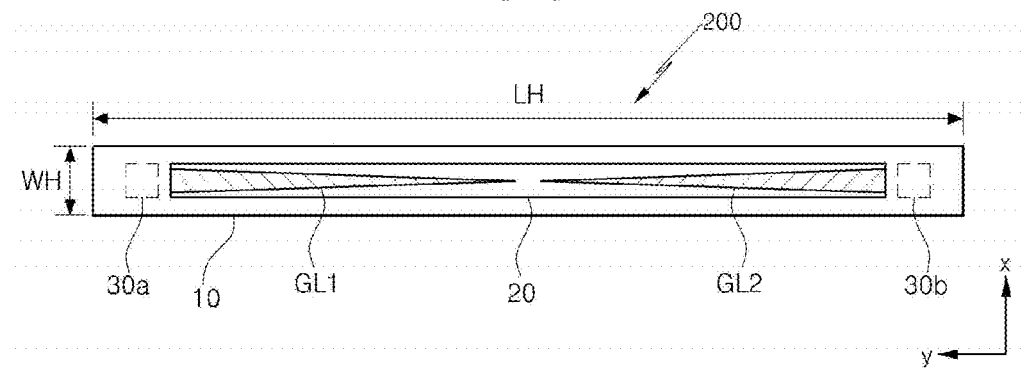
FIG. 15 is a plane view of a lighting device according to still another embodiment of the present disclosure.

FIG. 15 is a plane view of a lighting device according to still another embodiment of the present disclosure.

Referring to FIG. 15, a lighting device 200 according to the present embodiment is configured to include the light guide portion 10, the pattern layer 20, and the light source portion. The lighting device 200 has a predetermined length LH and width WH in a plane. The length LH and the width WH may be formed similar or identical to a length or a diameter of a 20 W fluorescent lamp or a 40 W fluorescent lamp. The light guide portion 10 and the pattern layer 20 may form a single optical member.

The pattern layer 20 includes the multiple patterns that extend from one surface in the x-direction and are sequentially arranged in the y-direction. The multiple patterns serve as a three-dimensional effect forming portion. The light guide portion 10 may be provided to bury or surround the pattern layer 20. In the present embodiment, the light guide portion 10 and the pattern layer 20 may be identical to the light guide portion 10 and the pattern layer 20 of the embodiment previously described with reference to FIG. 14.

The light source portion is configured to include a first light source 30a and a second light source 30b arranged at both ends in a length direction of the light guide portion 10. The first light source 30a and the second light source 30b may be provided with one among various existing light sources such as an incandescent lamp, a halogen lamp, a discharge lamp and the like or may be provided using indirect light sources such as a guide member for guiding or reflecting natural light generated from the sun. Also, the first light source 30a and the second light source 30b may be provided to include LED (Light Emitting Diode) elements according to some embodiments. In this case, the light source portion may include a printed circuit board in which the first light sources 30a, the second light source 30b and a drive circuit supplying power to these light sources are installed.

In the present embodiment, the first light source 30a and the second light source 30b irradiate light from both ends in the length direction of the light guide portion 10 to a central part. According to this configuration, through a pattern design of the three-dimensional effect forming portion, the lighting device 200 may express an incident beam from each of the two light sources 30a, 30b as respective line shaped beams GL1, GL2 which start from the both ends in the length direction of the light guide portion to extend in a direction facing the central part and disappear from the central part.

Also, according to the present embodiment, in different areas of the light guide portion, when a beam in roughly a hemispherical shape is irradiated on the basis of the light source (or a light emitting surface of the light source), by controlling the light source through a pattern design, line shaped beams extending in opposite directions, or line shaped beams extending in directions having an angle of more than 90° and less than 180° in the opposite directions, namely, directions crossing each other, may be implemented. Also, according to some embodiments, by controlling the incident beam of the light source through a pattern design, line shaped beams extending in the same direction or line shaped beams extending in directions crossing each other in the same direction may be implemented (see FIG. 17).

Meanwhile, the lighting device 200 according to the present embodiment may further include a support member or a housing. The support member may be substantially identical the support member 110 of the lighting device 100D previously explained with reference to FIG. 14.

Figure 16:
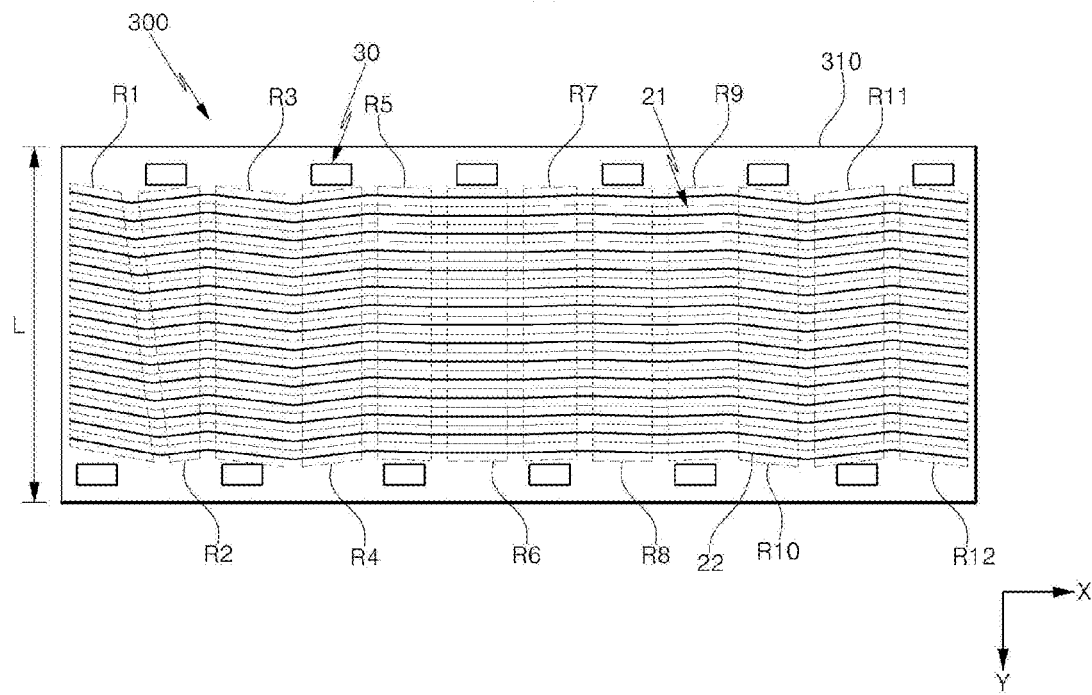
FIG. 16 is a plane view of a lighting device according to still another embodiment of the present disclosure.

FIG. 16 is a plane view of a lighting device according to still another embodiment of the present disclosure.

Referring to FIG. 16, a lighting device 300 according to the present embodiment is configured to include: the light guide portion; the three-dimensional effect forming portion 21; the light source portion 30 and the support member 310.

Except for the fact that the light guide portion includes the three-dimensional effect forming portion 21 provided in each of the different areas R1, R2, R3, R4, R5, R6, R7, R8, R9, R10, R11 and R12, and twelve light sources for irradiating each beam to the different areas, the light guide portion may be substantially identical to the light guide portion 10a of the lighting device of FIG. 1 or the light guide portion 10 of the lighting device of each of FIGS. 10 to 15.

The three-dimensional effect forming portion 21 may be provided inside the light guide portion or on the first surface or the second surface of the light guide portion. Also, the three-dimensional effect forming portion 21 may be provided so that the multiple patterns of the first area R1 arranged at one side of the light guide portion 10 can integrally continuously extend to the multiple patterns of the twelfth area R12 arranged at the other side of the light guide portion 10 via the multiple patterns of the second to eleventh areas R2 to R11 arranged at the center of the light guide portion. At this time, the respective patterns of the three-dimensional effect forming portion 21 may have a bent portion at a boundary part between two adjacent areas.

The three-dimensional effect forming portion 21 of the present embodiment may be substantially identical to any one of the three-dimensional effect forming portions of the lighting devices previously explained with reference to FIGS. 1 to 15, except for the fact that the three dimensional forming portion includes the multiple patterns sequentially arranged in the different areas R1 to R12, respectively of the light guide portion 10.

The light source portion 30 includes twelve light sources for irradiating light to the respective patterns of the multiple groups of the three-dimensional effect forming portion 21 provided in each of different areas R1, R2, R3, R4, R5, R6, R7, R8, R9, R10, R11 and R12 of the light guide portion 10. In the present embodiment, the respective light sources are LED light sources. Each of the light sources is an LED package including two LED elements and is provided so as to emit two beams via the respective LED elements.

The respective light sources may be LED light sources. In the present embodiment, each of the light sources may be an LED package including LED elements and may be provided to emit two beams via the respective LED elements. Also, when the light source portion 30 includes a first light source and a second light source, the first light source and the second light source may be arranged to irradiate the light in directions parallel to each other in the same direction or in directions crossing each other in the same direction. Also, according to some embodiments, the first light source and the second light source may be arranged to irradiate the light in a single straight line direction or in directions parallel to each other in opposite directions, or to irradiate the light in different directions having an angle of more than 90° and less than 180° between the first light source and the second light source.

The support member 310 supports the light guide portion or the light source portion 30. The support member 310 may be substantially identical to the support member 110 of the lighting device 100D previously described with reference to FIG. 14, except for the fact that the support member has an increased size or is provided to support the multiple light sources.

Figure 17:
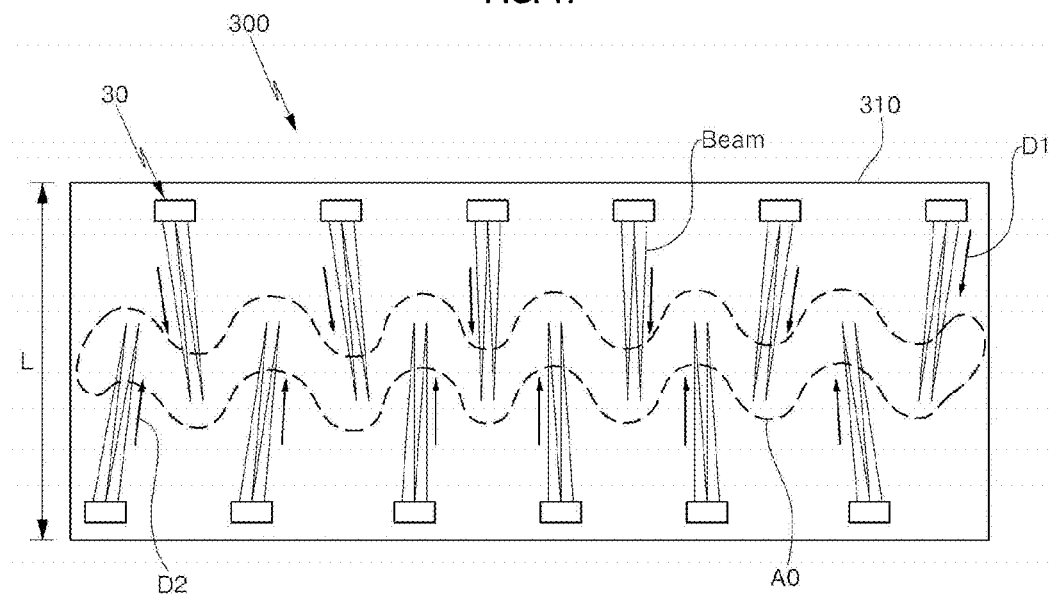
FIG. 17 is an plan view showing an operational state of the lighting device of FIG. 16.
Figure 18:
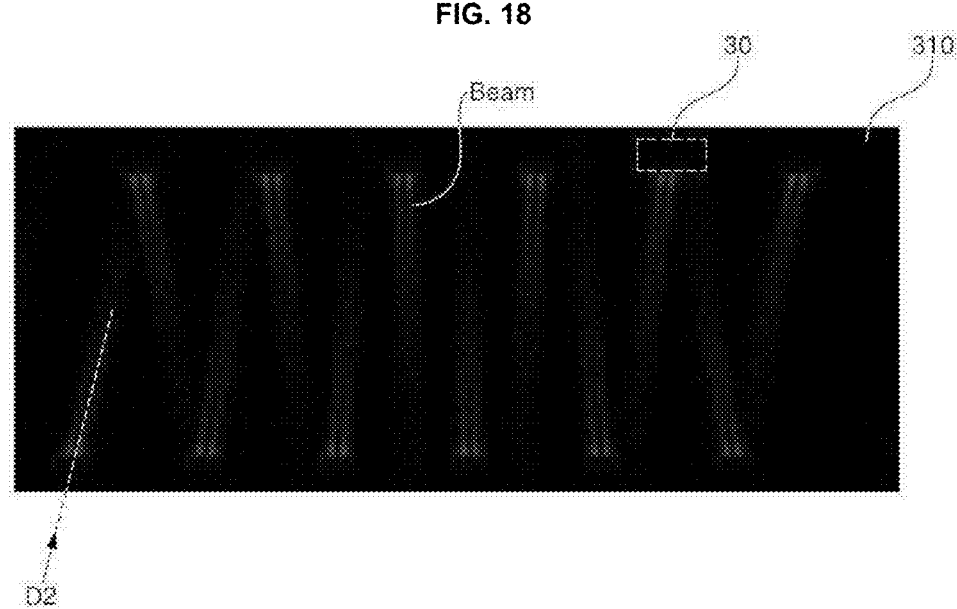
FIG. 18 is am operational state view of the lighting device of FIG. 16.

FIG. 17 is a plan view showing an operational state of the lighting device of FIG. 16. FIG. 18 is an operational state view of the lighting device of FIG. 16.

Referring to FIGS. 17 and 18, when the lighting device of the present embodiment is operated, an incident beam of each of the light sources is irradiated from edges of both sides in a width direction of the light guide portion or the support member 310 to a central part A0, and is converted into a line shaped beam traveling to the first path D1, D2 and the like having a predetermined optical width via the patterns of the respective areas of the light guide portion. Here, the optical width of the line shape beam may be less than a width of the light emitting surface of the light sources irradiating the light to the patterns, and a length of the line shaped beam may be larger than the optical width.

According to the present embodiment, by using the multiple patterns of the three-dimensional effect forming portion provided on the support member 310 having a length L of the width direction of about 250 mm, the light of a white LED lamp of about 10 W may be implemented as a three-dimensional effect beam or a line shaped beam with a three-dimensional effect in which the intensity of light of the light sources becomes largely weak or disappears at roughly the central part A0 in a width direction of the support member 310.

That is, according to the present embodiment, the incident beam passing along the light guide portion or the three-dimensional effect forming portion may be expressed by the sequentially arranged patterns as a three-dimensional effect beam in which the intensity of light reduces rapidly and disappears at a very relatively short distance (for example, about 100 to 200 mm). Here, the very short distance corresponds to a short distance beyond '1/(hundreds to thousands of' times compared to a distance (for example, several meters to tens of meters) in which light passing along a transparent substrate is naturally reduced and disappears when the light is irradiated to the transparent substrate (corresponding to the base substrate) of a comparative example in which main patterns are not provided.

Meanwhile, in the present embodiment, it is illustrated that each of the light sources of the lighting device irradiates two beams by using the LED package having two LED elements as the light sources, but the present disclosure is not limited to such a configuration. Each of the light sources may irradiate one beam by using the LED package having one LED element as the light sources.

Figure 19:
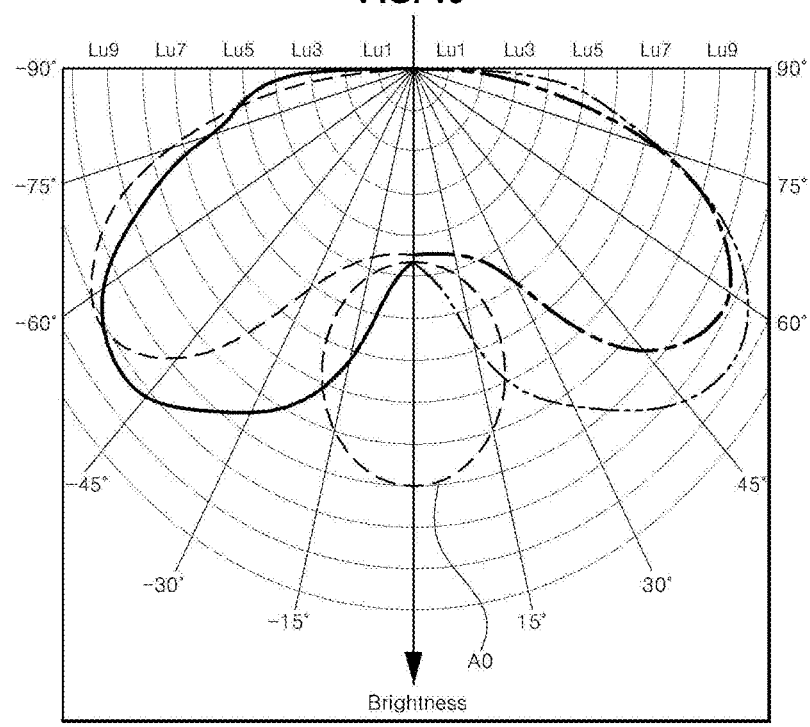
FIG. 19 is a brightness graph of the light device of FIG. 18.

FIG. 19 is a brightness graph of the light device of FIG. 18.

The graph of the present embodiment results from measuring brightness by a brightness measuring instrument in a front central part of the lighting device of FIG. 18.

Referring to FIG. 19, when the intensity of light of the light source is Lu12 maximally, it can be seen that a first brightness (about Lu5) in the central area A0 of the front of the light emitting surface of the light source of the lighting device (see reference numeral 300 of FIG. 13) is relatively largely small compared to a second brightness (about Lu7 to about Lu12) in the other areas of the front of the light emitting surface. In particular, in consideration of the fact that the first brightness in the central area A0 is affected by the second brightness in the other areas of the periphery, the intensity of light in the central area A0 of the light emitting surface of the lighting device can be really predicted to be near to 0.

The reason why the measurement results of the graph are shown is because the incident beams passing along the multiple patterns of the three-dimensional effect forming portion are sequentially refracted and reflected from the inclined surfaces of the patterns. When this principle is used, optical images (line shaped beams, the three-dimensional effect beam and the like) having desired shapes may be implemented through a pattern design.

Figure 20:
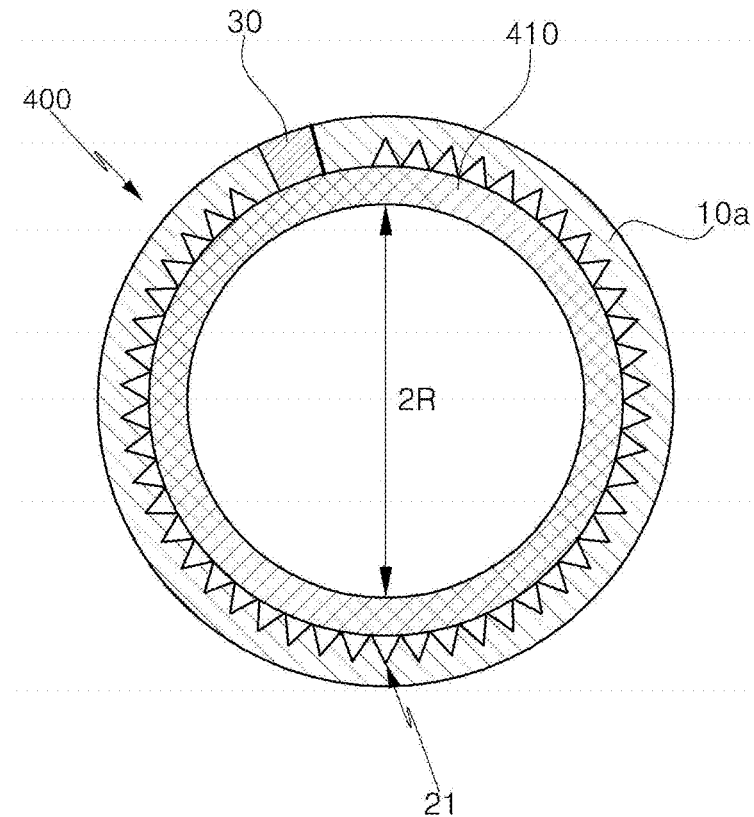
FIG. 20 is a cross-sectional view a lighting device according to still another embodiment of the present disclosure.

FIG. 20 is a cross-sectional view a lighting device according to still another embodiment of the present disclosure.

Referring to FIG. 20, a lighting device 400 according to the present embodiment is configured to include: the light guide portion 10a; the three-dimensional effect forming portion 21; the light source portion 30; and a support member 410.

In the present embodiment, the light guide portion 10a and the three-dimensional effect forming portion 21 may be substantially identical to any one of the light guide portions and the three-dimensional effect forming portions of the embodiments previously described with reference to FIGS. 1 to 9.

In the present embodiment, the light guide portion 10a may have a thickness of about 25 to 250 μm or less. When the thickness of the light guide portion 10 is smaller than 25 μm it may be difficult to produce the light guide portion and durability may be largely reduced. Also, when the thickness of the light guide portion 10 is larger than 250 μm flexibility is reduced, so that it may be difficult to install the light guide portion at the support member 410 have a predetermined curvature R2.

The light source portion 30 has a thickness similar to or smaller than the thickness of the light guide portion 10 and is disposed to irradiate light on one side of the light guide portion 10. The light source portion 30 may be provided as an LED package including one or two or more LED elements.

The support member 410 may be a housing having a predetermined curvature such as 1/R and the like, a wall inside or outside a building having a bent portion, or one surface of a product. In the present embodiment, the support member 410 has a hollow type cylindrical shape having a predetermined diameter 2R.

The support member 410 may be implemented using devices or products without being specially limited if the devices or products enable the light guide portion 10 on the sheet and the three-dimensional effect forming portion 21 to be disposed on one side of the light source portion 30 to which light is irradiated. Furthermore, the support member 410 may be implemented using a circular or hollow cap, clothing, shoes, a bag, an accessory, indoor and outdoor interior components and the like to which the light guide portion 10 of the sheet phase may be attached.

According to the present embodiment, the light guide portion and the three-dimensional effect forming portion are disposed in an application product, an article or a building having a curvature so that illumination of various optical designs may be implemented by line shaped beams or line shaped beams with a three-dimensional effect.

Figure 21:
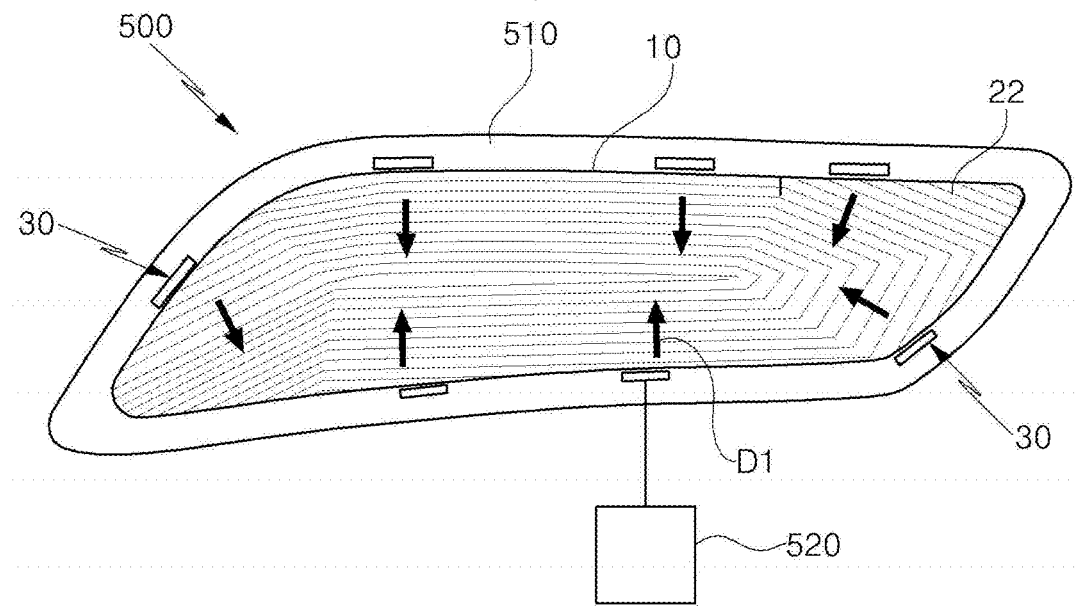
FIG. 21 is a plan view of a lighting device according to still another embodiment of the present disclosure.

FIG. 21 is a plan view of a lighting device according to still another embodiment of the present disclosure.

Referring to FIG. 21, a lighting device 500 according to the present embodiment is configured to include: the light guide portion 10, the three-dimensional effect forming portion, the light source portion 30 and an outer lens 510. When the lighting device 500 is used for illumination for a vehicle, the light source of the light source portion 30 may be operated by power supplied from a battery 520 of a car.

The light guide portion 10 may be substantially identical to the light guide portions of the lighting devices previously described with reference to FIGS. 1 to 20, except for the light guide portion has a streamlined shape as viewed from a plane and has a curvature from a fixed portion in a thickness direction.

The three-dimensional effect forming portion is configured to include multiple patterns provided in different areas of the light guide portion 10. Such a configuration of the three-dimensional effect forming portion is substantially similar or identical to that of the three-dimensional effect forming portion of the lighting device 300 previously described with reference to FIG. 16, and accordingly, the detailed description thereof is omitted for avoiding overlapping.

The light source portion 30 includes multiple light sources arranged at an edge of one surface along a streamlined shape of the light guide portion 10. The configuration of the other light sources of the light source portions 30 may be substantially identical to that of the light sources of the light source portion for the lighting device previously described with reference to FIGS. 1 to 20.

The light guide portion 10 and the three-dimensional effect forming portion are arranged on one surface of an outer lens 510. The light guide portion 10 may be bonded to one surface of the outer lens 510 or may be arranged to be separated from the one surface of the outer lens by a predetermined distance. Also, the light source portion 30 may be disposed on the one surface of the outer lens 510 or on the other surface corresponding to an opposite surface of the one surface. The light sources of the light source portion 30 may be buried in the light guide portion 10.

The outer lens 510 refers to a lens-shaped cover disposed on an outer surface of the lighting device such as a light device for a vehicle (a headlight, a rear light and the like), an outdoor lighting device and the like. When the outer lens is used in vehicles, the outer lens 510 may be provided on one surface, in which the light guide portion 10 or the three-dimensional effect forming portion is disposed, so as to have a curvature leading to a curved surface of a vehicle body.

The outer lens 510 may be made of a transparent plastic material, for example, engineering plastic and the like.

According to the present embodiment, through a design of the patterns of the three-dimensional effect forming portion, it can be provided with the lighting devices useful for lighting devices for vehicles, such as a headlight, a rear light, car indoor illumination, a fog lamp, a door scarf or the like. That is, in terms of a volume, a thickness, a weight, a price, a life span, a stability, a degree of freedom in design, and easiness of installation, the lighting device 500 of the present embodiment may be usefully applied compared to the existing lamps for vehicles.

Meanwhile, the lighting device 500 of the present embodiment is not limited to a lighting device for vehicles, and may be applied to a curve portion or a bent portion inside or outside an object for illustration installation, such as a building, equipment, furniture and the like, as a flexible lighting device in a film form. In this case, the outer lens 510 may be a transparent support member or a housing for supporting the light guide portion, a combination of the light guide portion and the three-dimensional effect forming portion, or the light source portion 30.

As set forth above, some embodiments of the present disclosure may provide the lighting devices capable of implementing optical images having desired shapes using a line shaped beam by controlling an optical path, an optical width and a change in brightness through a pattern design to create the line shaped beam.

According to some embodiments of the present disclosure may provide the lighting devices capable of implementing line shaped beam images having desired shapes by controlling an optical path, an optical width and luminous intensity through a pattern design.

According to some embodiments of the present disclosure may provide the lighting devices capable of implementing line shaped beam images having desired shapes by a pattern design and a combination of light guide structures.

As previously described, in the detailed description of the disclosure, having described the detailed exemplary embodiments of the disclosure, it should be apparent that modifications and variations can be made by persons skilled without deviating from the spirit or scope of the disclosure. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents.

An aspect of embodiments of the present disclosure provides a lighting device capable of implementing line shaped beam images having desired shapes by controlling an optical path, an optical width and luminous intensity.

Another aspect of embodiment of the present disclosure may provide a lighting device capable of implementing line shaped beam images having desired shapes by a pattern design and a combination of light guide structures.

According to an aspect of embodiments of the present disclosure, there is provided a lighting device, including: a light source portion having at least one light source; a light guide portion having a larger thickness than a height of a light emitting surface of the light source and irradiated by an incident beam of the light source from a side; and a three-dimensional effect forming portion provided inside the light guide portion, on a first surface of the light guide portion, or on a second surface opposite to the first surface. Here, the three-dimensional effect forming portion comprises multiple patterns sequentially arranged and having respective inclined surfaces with inclined angles with respect to the first surface. Here, the multiple patterns guide light passing along the light guide portion into a first surface direction toward which the first surface looks, or a second surface direction toward which the second surface looks by refraction and reflection from the inclined surfaces, thereby implementing line shaped beams of a first path crossing at right angles to respective pattern extension directions of the multiple patterns.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
a light source portion having at least one light source;
a light guide portion having a first surface and a second surface opposite to the first surface; and
a three-dimensional effect forming portion provided in the light guide portion and including multiple patterns, the multiple patterns having respective inclined surfaces inclined with respect to the first surface or the second surface of the light guide portion to form respective concave portions or respective convex portions,
wherein the multiple patterns are continuously arranged in a first direction and extend in a second direction vertical to the first direction,
wherein the multiple patterns reflect light so that the light passes through the second surface of the light guide portion, thereby implementing line shaped beams in the first direction,
wherein the three-dimensional effect forming portion is spaced from the first surface of the light guide portion and spaced from the second surface of the light guide portion, and
wherein the three-dimensional effect forming portion is provided closer to the first surface of the light guide portion than the second surface of the light guide portion.

2. The lighting device of claim 1, wherein the respective pattern extension directions of the multiple patterns extend from at least one point in radial directions not parallel to each other.

3. The lighting device of claim 1, wherein the at least one light source is buried inside the light guide portion and provided at at least one side of the three-dimensional effect forming portion.

4. The lighting device of claim 3, wherein the lighting device includes a support,
wherein the light source portion and the three-dimensional effect forming portion are provided on one surface of the support, and
wherein the light source portion and the three-dimensional effect forming portion are provided between the light guide portion and the support.

5. The lighting device of claim 1, wherein a pitch (Lp) between two adjacent patterns among the multiple patterns is 10 to 500 μm.

6. The lighting device of claim 1, wherein a space filled with a transparent material is provided between the light source portion and the light guide portion.

7. The lighting device of claim 1, wherein each of the multiple patterns has a lenticular form, and
wherein a rate of a width to a height (h/w) of each of the multiple patterns is smaller than ½.

8. The lighting device of claim 7, wherein the three-dimensional effect forming portion includes a pattern separation provided between two adjacent patterns of the multiple patterns, and
wherein a width of the pattern separation is smaller than ⅕ of a width of each of the multiple patterns.

9. The lighting device of claim 1, wherein each of the multiple patterns includes a pattern structure having a polygonal cross-section.

10. The lighting device of claim 9, wherein the polygonal cross-section of each of the multiple patterns includes an interrupted surface parallel to the first surface or second surface of the light guide portion, and
wherein the interrupted surface is configured to prevent light from being emitted outside via reflection or refraction.

11. The lighting device of claim 1, wherein a refractive index of the light guide portion is 1.30 to 1.80, and an inclination angle is larger than 33.7° and smaller than 50.3°, or is larger than 49.7° and smaller than 56.3°.

12. The lighting device of claim 1, wherein a refractive index of the light guide portion is 1.80 to 2.50, and an inclination angle is larger than 23.6° and smaller than 56.3°, or is larger than 33.7° and smaller than 66.4°.

13. The lighting device of claim 1, wherein a cross-section of the three-dimensional effect forming portion is in a zigzag shape.

14. The lighting device of claim 1, wherein the light guide portion has a thickness of 0.1 mm or more and 10.0 mm or less.

15. The lighting device of claim 14, wherein the light guide portion has a thickness of 250 μm or less or more than 250 μm.

16. The lighting device of claim 1, wherein the three-dimensional effect forming portion includes first patterns and second patterns provided in different areas of the first surface of the light guide portion, and the first patterns and the second patterns create line shaped beams extending in different directions.

17. The lighting device of claim 1, wherein the light source portion includes a first light source and a second light source, the first light source and the second light source irradiating light from the same direction to directions parallel to each other or irradiating light from the same direction to directions crossing each other.

18. The lighting device of claim 1, wherein the light source portion includes a first light source and a second light source, the first light source and the second light source irradiating light from opposite directions to a straight line direction or directions parallel to each other, or irradiating light to different directions having an angle of more than 90° and less than 180° between the first light source and the second light source.

19. The lighting device of claim 1, wherein the light source includes at least one LED package having one or two or more LED elements and irradiates light to a hemispherical area based on a light emitting surface of the respective light sources, and the three-dimensional effect forming portion implements the line shaped beams inside the hemispherical area.

\* \* \* \* \*